Figure 1B:
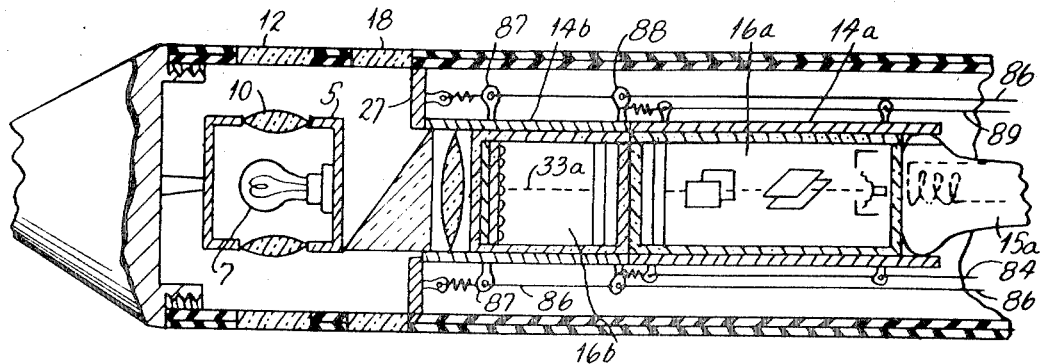

Jan. 21, 1969    E. E. SHELDON    3,423,620
VACUUM TUBE DEVICE HAVING LIGHT CONDUCTING RODS
AND LUMINESCENT SCREEN
Original Filed Dec. 4, 1961    Sheet 1 of 8
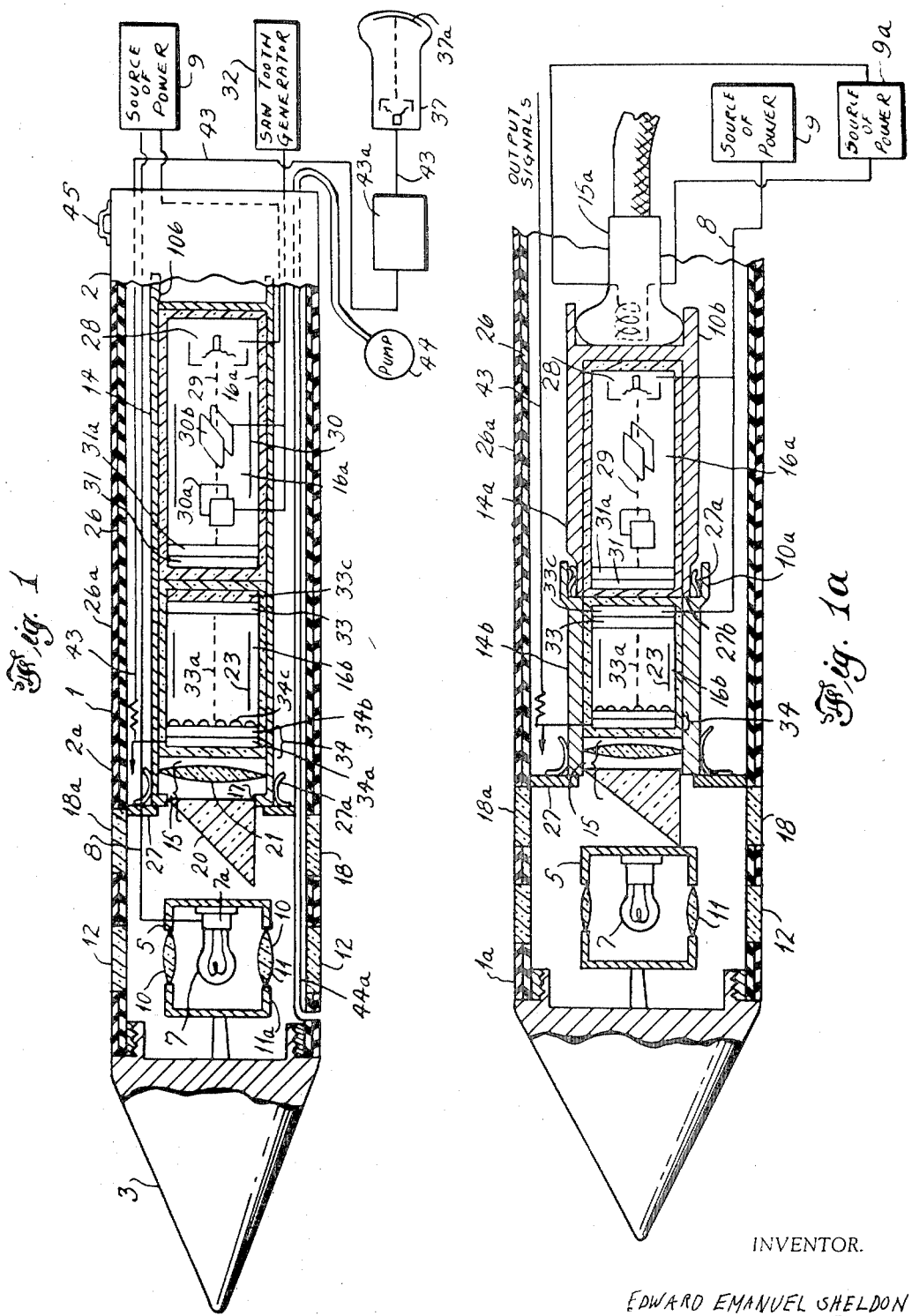
INVENTOR.
EDWARD EMANUEL SHELDON

INVENTOR.

EDWARD EMANUEL SHELDON

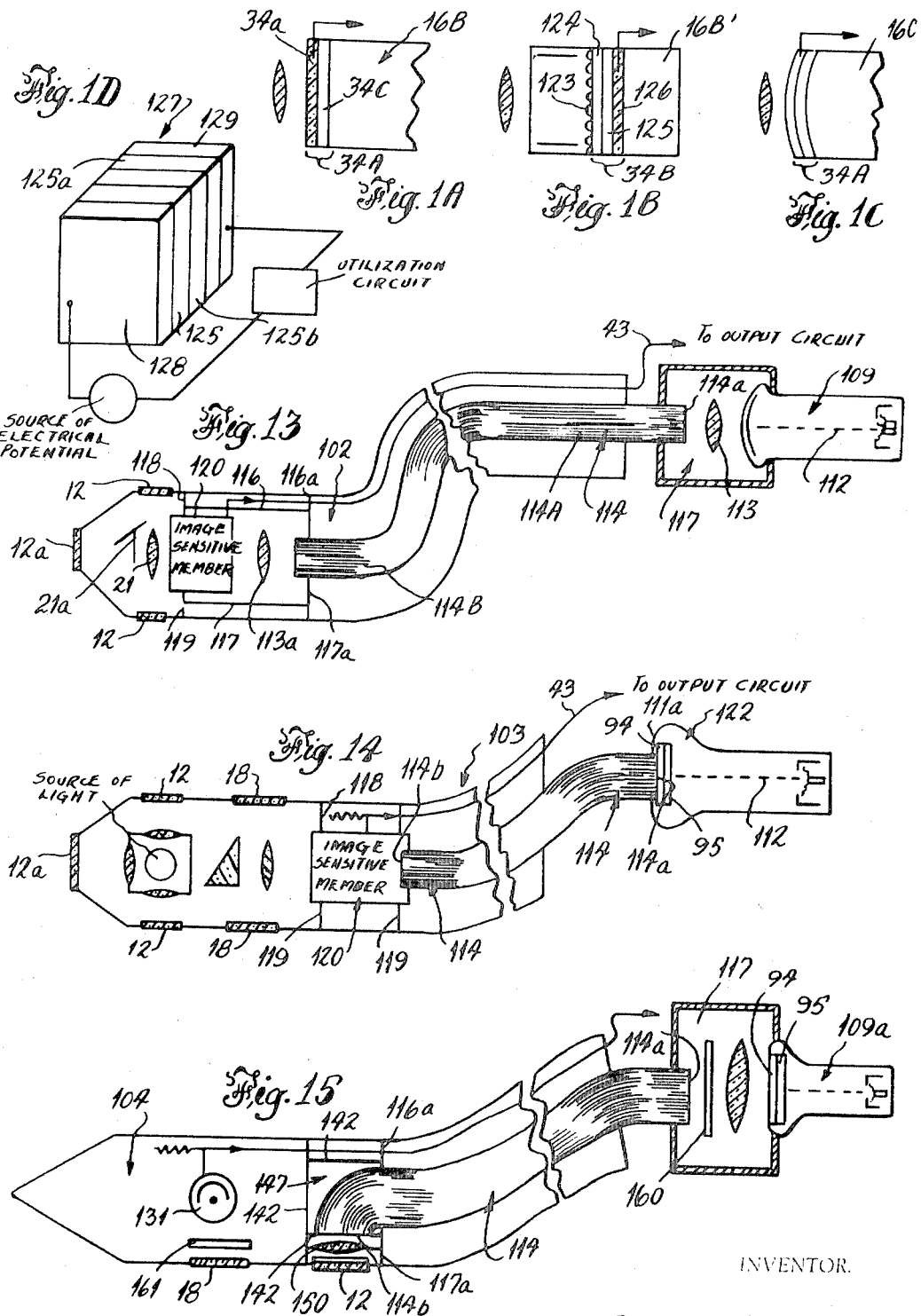

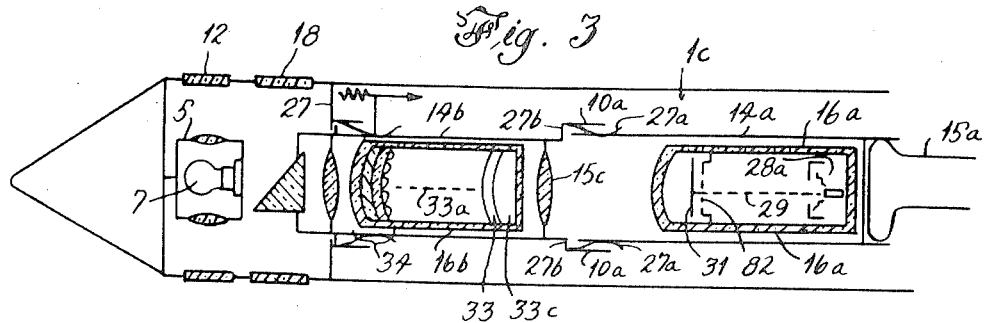
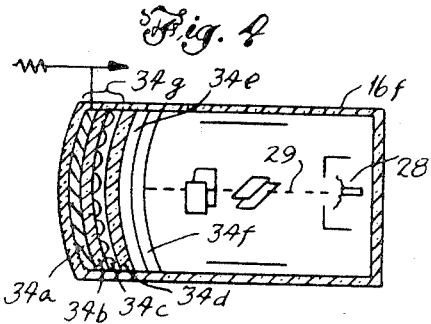
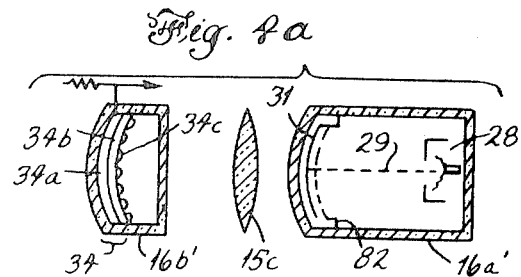
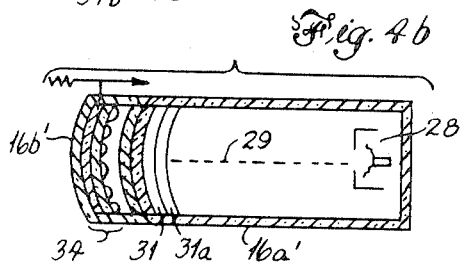
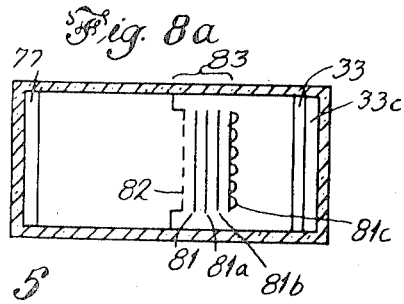
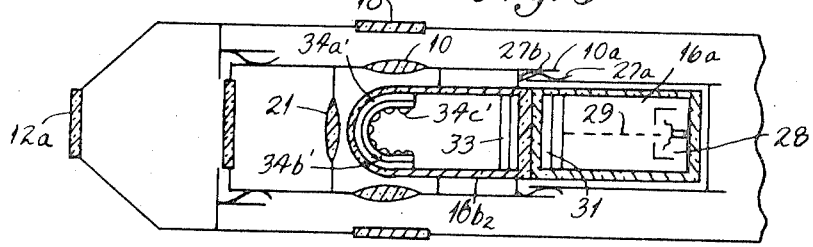
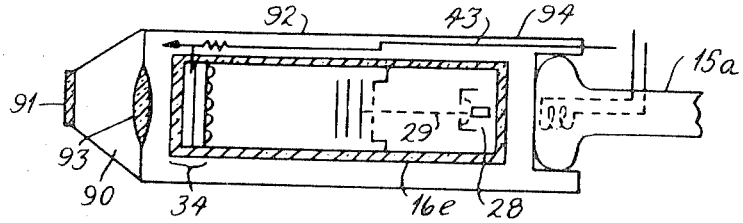
INVENTOR.
EDWARD EMANUEL SHELDON
By Laforest S. Saulsbury
Attorney

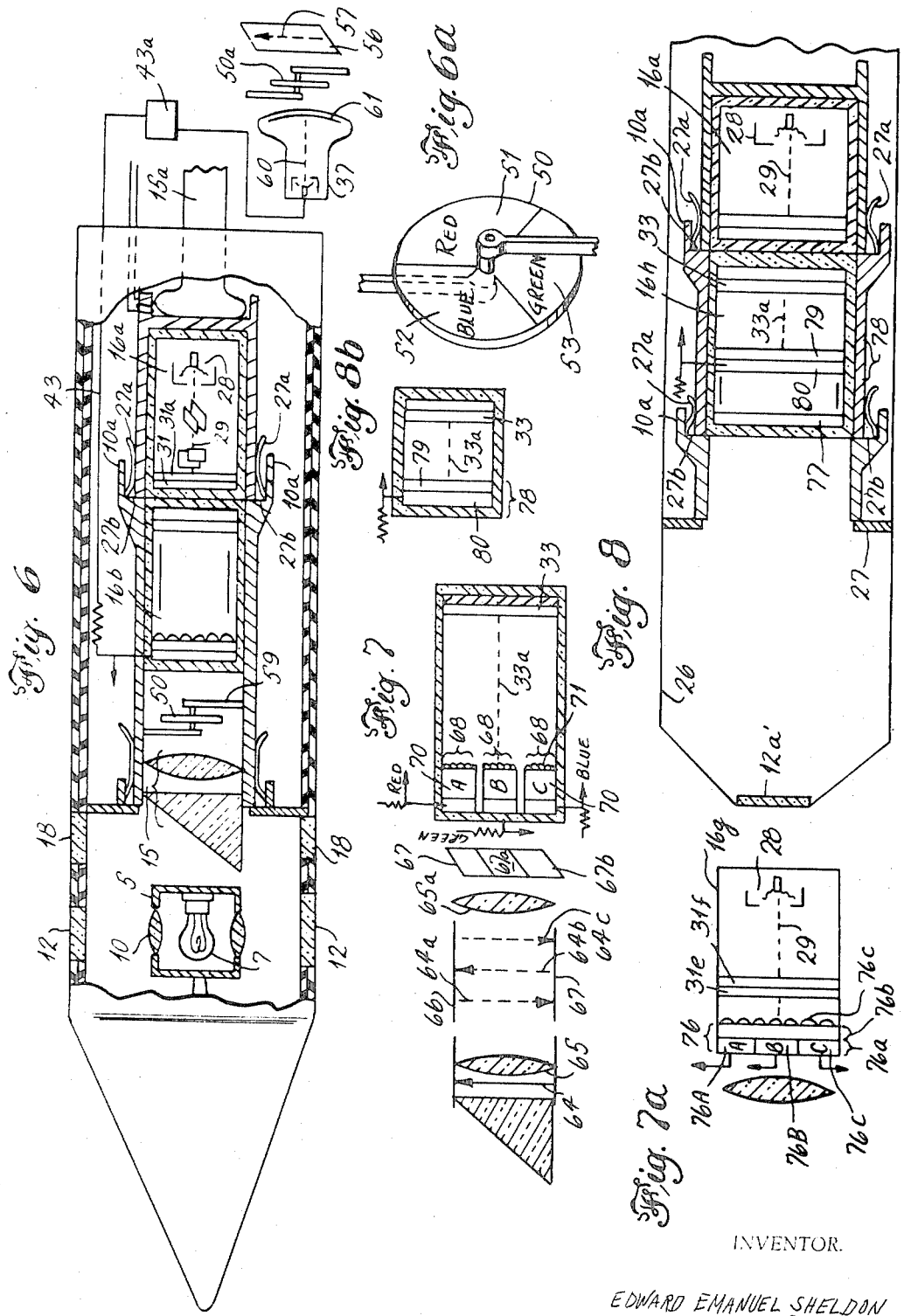

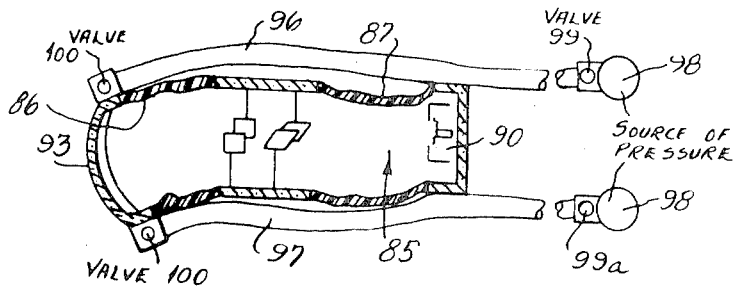
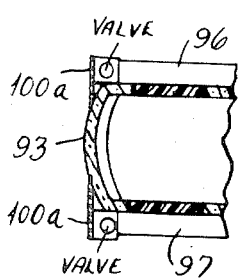
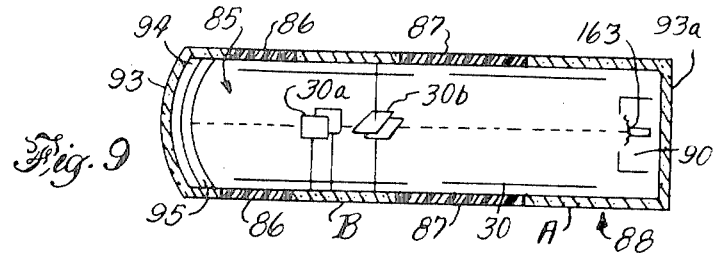
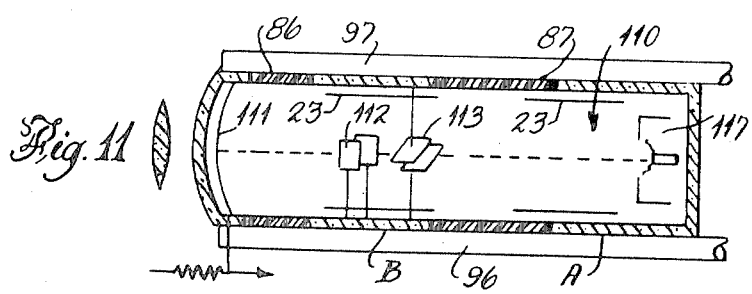
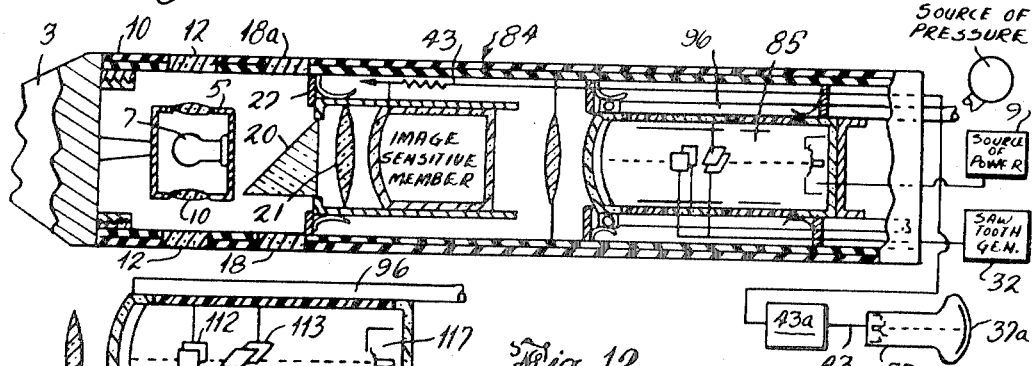
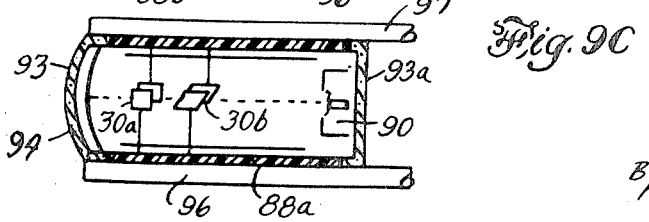
INVENTOR.
EDWARD EMANUEL SHELDON

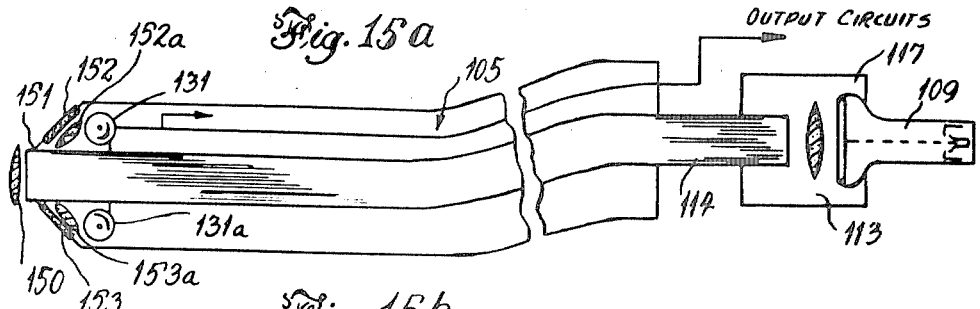
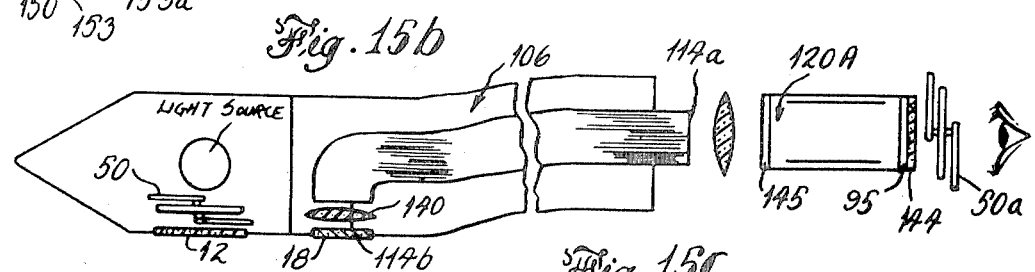
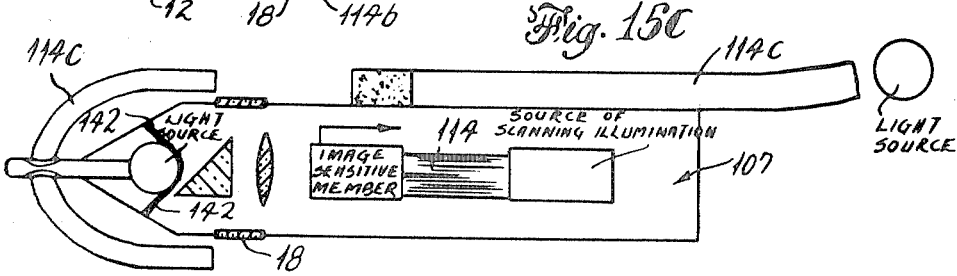
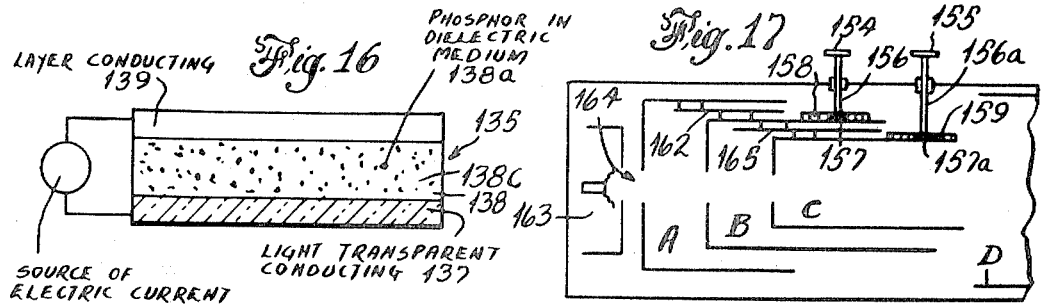
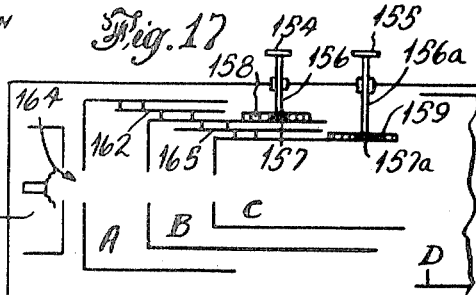
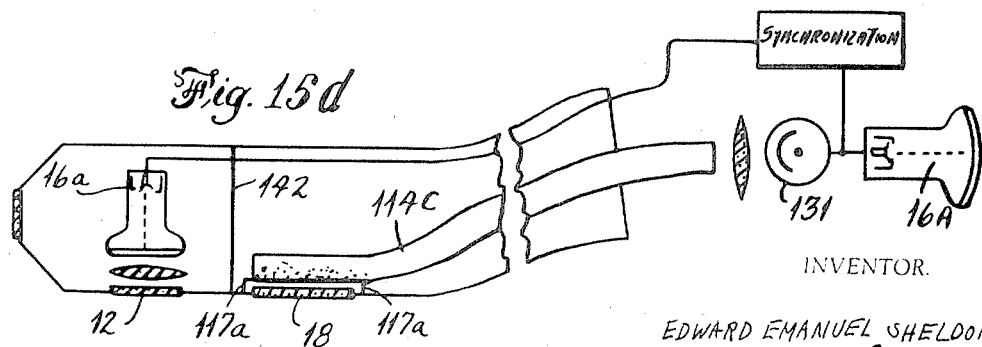

United States Patent Office 3,423,620
Patented Jan. 21, 1969

3,423,620
VACUUM TUBE DEVICE HAVING LIGHT CONDUCTING RODS AND LUMINESCENT SCREEN
Edward Emanuel Sheldon, 30 E. 40th St.,
New York, N.Y. 10016
Original application Dec. 4, 1961, Ser. No. 158,638, now Patent No. 3,279,460, dated Oct. 18, 1966. Divided and this application Oct. 20, 1965, Ser. No. 498,959
U.S. Cl. 313—65                              19 Claims
Int. Cl. H01j 31/26

This invention relates to novel photoelectric instruments for the transfer of images, and represents a division of my copending Ser. No. 158,638 now Patent No. 3,279,460 filed Dec. 4, 1961 and which has a common subject matter and was copending with my Patent No. 3,021,834 issued Feb. 20, 1962, and which was a continuation-in-part of my U.S. Patent 3,021,834 filed Nov. 28, 1956, and has a common subject matter with my U.S. Patent 2,877,368 filed Mar. 11, 1954.

The purpose of my invention is to intensify the image of the examined internal parts or passages so that the final image will be presented to the observer with the luminosity facilitating inspection of said image.

Another objective of this invention is to change, decrease or amplify the contrast of the image of the examined part.

Another purpose of my invention is to enable simultaneous observation by many examiners of close or remote locations, which was not possible until now.

Another purpose of my invention is to provide means for simultaneous visual inspection, and photographic recording of the examined area which also has never been possible before.

Another purpose of this invention is to provide means for inspection of inaccessible channels, such as hollow parts of machinery or of other inaccessible tortuous passages. My device may be introduced inside of a part which cannot be inspected visually without dismantling or destroying the whole machine and will transmit the image of said part to the observer outside of said part. My invention will be especially useful for the examination of coils and pipes or other curved structures. My device can be also used as a probe to be inserted into a solid object and to transmit information about its internal structure.

The objectives of my invention were realized by a novel device which is flexible to allow its introduction into the examined part regardless of its curvatures or angulations and which after its introduction into the examined part will produce a light image of said part. Video signals are reconverted in receivers outside of the examined part into visible images for inspection or recording. My intrascopic device can produce black and white images, as well as multicolor images, showing faithfully or arbitrarily the colors of the examined part.

In particular this novel device besides other inventive features makes the use of a television pick-up tube consisting of two separate independent elements which can be introduced separately into the examined part and which after introduction work in cooperation as a television camera. As each of these two separate elements is smaller in size than any conventional television camera can be made, this novel television camera can be introduced into locations which, because of small size or tortuous shape of passages leading to them, were inaccessible to the most miniaturized television cameras known in the art.

Another marked improvement in my novel television camera is elimination of magnetic deflecting and focusing coils which are bulky and occupy so much space that even a small television tube using them cannot be introduced into narrow passages. The use of conventional electrostatic deflecting system results in a marked distortion of images especially in pick-up tubes using the slo wscanning electron beam. These drawbacks are eliminated in my intrascope and therefore in spite of its very small size it is capable of producing images of a good definition and contrast.

The above objectives of my invention were accomplished by the use of novel imaging devices and novel vacuum tubes which are provided with fiber-optic means in combination with photoelectric means and/or in combination with luminescent means.

Figure 2:
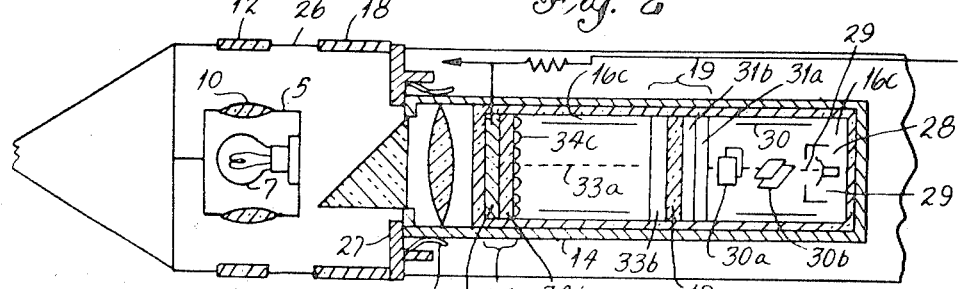
Figure 2A:
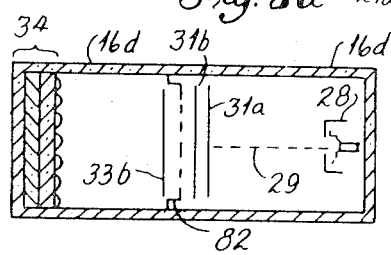
Figure 2B:
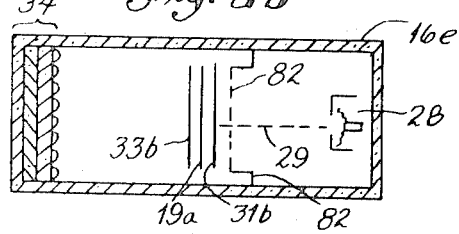
Figure 2C:
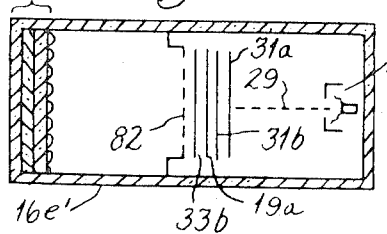
Figure 2D:
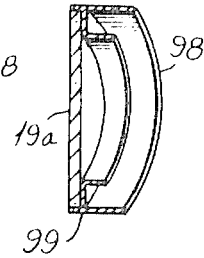
Figure 2E:
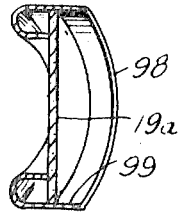
Figure 18:
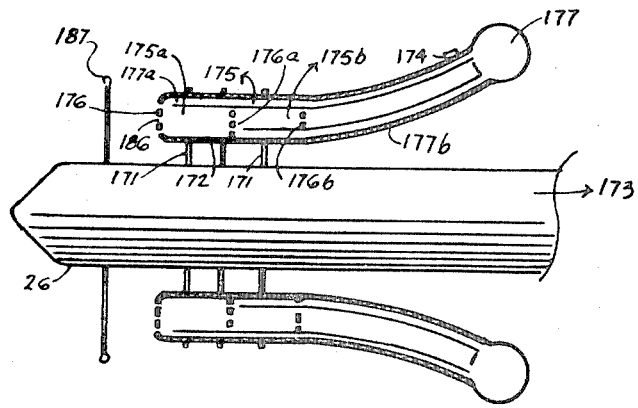
Figure 19:
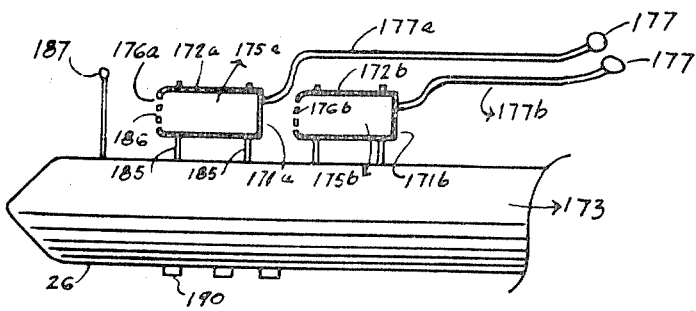
Figure 20:
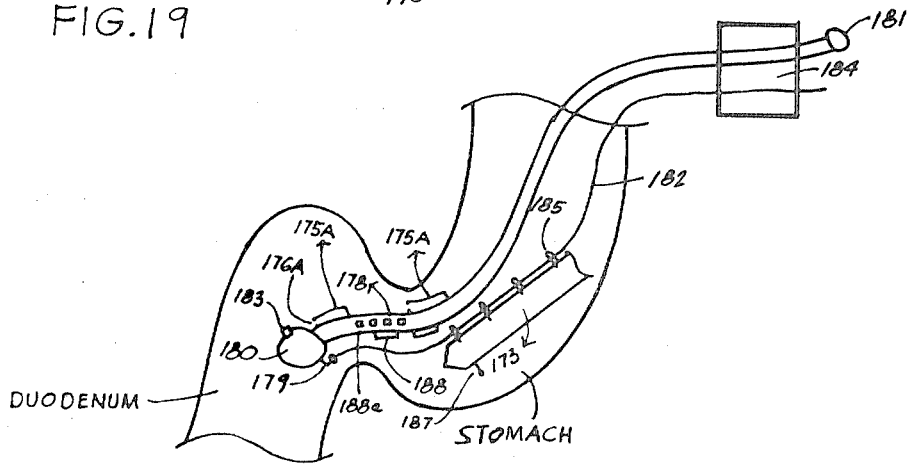

In the drawings:
FIGURE 1 represents a partially sectioned view of the novel instrument for inspection of inaccessible parts;
FIGURE 1a shows a modification of the intrascope;
FIGURES 1A, 1B, 1C and 1D show modifications of the image sensitive member;
FIGURE 1b shows the intrascope in combination with the pushing guide for introduction of component parts of the television camera into the intrascope;
FIGURE 2 shows the intrascope provided with a modification of the television camera;
FIGURES 2, 2b and 2c represent modifications of the television camera;
FIGURES 2d and 2e represent a cross-sectional perspective view of supporting element for the composite target in the television camera;
FIGURE 3 shows a modification of the intrascope having an optical system;
FIGURES 4, 4a and 4b show simplified cameras for the intrascope;
FIGURE 5 shows an intrascope without illuminating source;
FIGURE 5a is a simplified form of intrascope shown in FIGURE 5;
FIGURE 6 represents an intrascope for producing color images;
FIGURE 6a represents color disc;
FIGURE 7 represents a modification of the intrascope for color images;
FIGURE 7a represents a simplified form of an intrascope for color images;
FIGURE 8 represents an intrascope sensitive to invisible images;
FIGURES 8a and 8b represent a modification of pick-up tube;
FIGURE 9 shows a novel flexible flying spot tube;
FIGURES 9a, 9b and 9c show modifications of the flexible flying spot tube;
FIGURE 10 shows a modification of the endoscope having flexible vacuum tube;
FIGURES 11 and 12 show a novel flexible television pick-up tube;
FIGURES 13, 14, 15 show a novel endoscope having image conductor;
FIGURES 15a, 15b, 15c and 15d show modifications of the novel endoscope with image conductor;
FIGURE 16 shows a novel flexible light source;
FIGURE 17 shows a novel vacuum tube having a telescopic electron gun.
FIGURES 18 and 19 show having propulsion means;
FIGURE 20 shows guiding means.

This new device which may be called the intrascope or endoscope 1 is shown in FIGURE 1. The handle 2 is a hollow tube of diameter corresponding to the examined part. The handle may be rigid or semi-flexible or completely flexible according to the part to be examined. At the end of the handle begins the flexible part 2a of the intrascope which also has width and length suitable for the size of the examined part. In case the intrascope is used for examination of fragile parts, the part 2a must be very flexible and pliable in order to avoid damage to the wall of the examined part. This basic feature of the material for the flexible part of the intrascope is therefore that it must be easily bent and molded by the walls of the passages in which it is being introduced. Such material may be rubber 26 or a suitable plastic, of the type used by Davol Rubber Company of Providence, R.I. In case the intrascope is used for investigation of sturdy parts or of machinery, the part 2a may be more rigid. The flexible part 2a of the intrascope may be in such a case made of the stainless steel spiral sheet designed not only for durability but also to maintain the proper degree of flexibility and elasticity. The metal spiral is tapered to insure its uniform bending. The intrascope may be covered with an outer tubing 26a such as of neoprene. This prevents dust particles and moisture from affecting the optical and pick-up system located inside of the intrascope. At the end of the flexible part there is a semi-flexible tip 3 which may be screwed on the flexible part and can be easily removed giving thereby access to the inner structures of the intrascope. The tip consists of a rubber conical finger and serves to facilitate the gliding of the intrascope within the examined part. In order to facilitate the introduction of the intrascope into parts which have no curves, my device can be made semi-rigid by inserting into it a semi-rigid stilet. In case the intrascope is used as a probe for insertion into a solid object, the tip 3 should preferably be rigid and sharply pointed to be able to pierce the examined object. In some cases the tip is provided with one or more windows at its end to transmit the light to the examined part and to receive the image of said part. The tip may also have a semi-spherical or other shape.

In some cases the examined part has to be distended by air or fluid insufflation prior to the examination. A special air pump attachment 44 and a channel 44a in the intrascope is provided for this purpose. The channel 44a may also serve to evacuate contents of the examined part before examination to improve visibility. The knob 45 on the proximal end of the intrascope serves to indicate to the examiner the position of windows 12 and 18 of the intrascope. In examination of living bodies, the layer 26 or 26a should be of a highly dielectric material to prevent any short circuits.

In the distal end of the flexible part of the intrascope there is a housing box 5 containing the illumination system 7. The box 5 may also be attached to the inner walls of the intrascope by means of the brackets or may be held by springs. It is obvious that there are many means for attachment of the box 5 which are well known in the art. All walls of the housing box 5 except the one facing the television pick-up tube 16 are provided with windows 10 for transmission of the light from the illuminating system 7. These windows are correlated with the windows 12 in the flexible part of the intrascope which transmit the light from the illuminating system to the examined part. In some cases the windows 12 may be made to extend over the circumference of the intrascope. In some cases the window to transmit illumination from the light source to the examined part may also be provided in the distal end of the intrascope instead of being in its side walls, and in such case the tip may be made of transparent material or may be omitted. Windows 12 may be provided with shutters which can be controlled from the proximal end of the intrascope which is outside of the examined part.

The illuminating system may consist of the electrical bulb 7. The electrical bulb may be mounted in the housing box 5 by means of a socket 7a. In some cases it is advantageous to use the objective lens 11 between the light bulb and window 12 in order to concentrate the light on one field. The lens may be held in position by brackets 11a. The light bulb is activated by the source of electrical power 9 situated outside of the examined part. Such a source may be the commercial electrical current or battery of dry cells. The flexible electrical cable 8 leads from the socket 7a to said outside source of electrical current 9. The cable is a lacquered, double insulated electric wire, is covered in addition with liquid rubber and is vulcanized in order to prevent a short circuit. The housing unit 5 may be in some cases omitted and the light source may be attached to the socket 7a which is held by brackets. In some cases electrical power of very high frequency is preferable.

In the flexible part 2a proximally to the housing box 5, there is a rigid non-transparent housing compartment 14 containing the optical system 15 and the novel television pick-up tubes 16a and 16b. The housing 14 has an opening 17 in which the optical system 15 is lodged and which serves to admit the image of the examined part. This opening is correlated with windows 18 in the flexible part of the intrascope which transmit the image of the examined part. In some cases the windows 18 may be made to extend over all the circumference of the intrascope. The windows 18 may be provided with shutters operated from the proximal end of the intrascope which is externally to the examined part. The housing 14 containing the television pick-up tubes 16a and 16b and the optical system may be attached to the inner wall of the flexible part 2a of the intrascope by means of brackets or may be held by springs 27a. As the housing box fits into the encasing holding member 26 and is held by it tightly, in some cases no additional supporting means such as springs are necessary.

The optical system 15 may consist of 90° gable prism 20 and of lens 21. The optical system may have its own housing unit instead of being lodged in the compartment 14 and may then be introduced into the intrascope separately.

In some cases it is desirable to have a large field of vision and at the same time to preserve the necessary demagnification of the examined part. In such case, instead of the prism 20, a rotating mirror should be used. The mirror has first surface coating which eliminates the reflections and is activated by the magnetic solenoid placed beneath the mirror. The solenoid is connected by the elastic cable with the controls outside of the examined part and can tip the mirror from the retrograde position to the forward position, giving thereby an additional field of vision without the necessity of moving the intrascope. The image of the examined part is reflected by the mirror on the objective lens which focuses said image on the photocathode of the novel television pick-up tube 16b described below. In case the demagnification of the examined part is not necessary a large field of vision can be obtained by using the lens providing 80° field of vision instead of the usual 45–50°. The image produced by the optical system is inverted but it can be reverted to the original position either by an additional lens or electron-optically in the viewing tube. The rotating mirror may also serve to admit image either through window 18 or 18a without rotating the whole camera 16.

The housing box 14 contains the novel miniature television camera 16 which was designed to reduce to the minimum the size of the television camera. The television pick-up tubes known previously in the art could be miniaturized only to a certain degree, which was not sufficient in certain applications as some of the examined parts are too small to allow the introduction even of the smallest conventional pick-up tube. This is true especially for the type of tubes having external deflecting coils such as of magnetic or electro-magnetic type, and in such situations, my novel camera 16 will be very suitable as it does not require any external deflecting or focusing coils at all. The camera 16 consists of two vacuum tubes 16a and 16b. The tube 16a has an electron gun 28 which produces an electron beam 29. The electron beam 29 is focused by electrostatic field 30. The electron-optical system for focusing the electron beam 29 may be simplified and markedly reduced in length by using the unipotential electrostatic lens instead of the usual two-lens system. The electron beam 29 is deflected by electrostatic plates 30a and 30b in two perpendicular to each other planes. The electrostatic plates are energized by signals from saw-tooth generators 32 which are situated outside of the examined part. The generators 32 are connected with electrostatic plates 30a and 30b by means of flexible wires. One deflecting field is produced by the horizontal deflection plates 30a and may have line frequency such as 5–15,000 cycles per second. Another deflecting field is provided by the vertical deflection plates 30b and may have field frequency such as 15–60 cycles per second. In this way the electron beam 29 is made to scan the fluorescent screen 31 in a regular television raster. The fluorescent screen 31 may be in some cases provided with electron-transparent metallic conducting backing layer 31a such as of aluminum. The fluorescent screen 31 must be of a phospher of a very short persistence in order to obtain a good resolution of the image. ZnO has decay time of 1 micro-second and is suitable for this purpose. Still better results may be obtained by means of ZnS phosphor and using only ultra-violet component of its fluorescent emission which has decay time of $1/10$ microsecond. In some cases, it is preferably to make the fluorescent screen 31 of semi-spherical curved shape as it will improve definition of the flying light spot. The fluorescent layer 31 may also be deposited on a supporting mesh screen instead of being deposited on the wall of the vacuum tube. This will improve definition of the flying light spot.

The vacuum tube 16a operates in combination with the vacuum tube 16b forming together the novel television camera 16. The vacuum tube 16b has a photoemissive electrode 33 which may be deposited or attached to one of the walls of said vacuum tube. In some cases it is preferable to provide a light transparent conducting layer 33, such as of material known in the trade as "Nesa," or of compounds of tin or of cadmium, on the side of said photoemissive electrode 33 facing the fluorescent screen 31. Such a layer must be very thin, e.g., of the order of microns in order not to impair the definition of images produced by the novel pick-up tube. The photoemissive electrode 33 may be of CsOAg or of caesium, sodium, lithium or rubidium on antimony, arsenic or bismuth, or a mixture of aforesaid elements. At the opposite end of the vacuum tube 16b there is provided a photocathode 34 which consists of a light transparent signal plate 34a, a light transparent insulating layer 34b and a photoemissive moasic 34c. The signal plate 34a may be a thin transparent layer of metal or other conducting material. The insulating layer 34b may be of mica, silica, or other transparent dielectric material and photoemissive mosaic 34c may be of CsOAg or of caesium, rubidium, potassium or lithium on antimony, arsenic or bismuth, or of a mixture of aforesaid elements. In some cases the photoemissive layer 34c may be, instead of a mosaic, also of continuous type. In cases in which electrostatic focusing field 23 is used to focus the scanning electron beam 33a on the mosaic 34c, much better resolution will be obtained by making such mosaic of a curved semispherical shape. In addition, the use of such spherically shaped photocathode will eliminate instability of the image which is very marked when using electrostatic fields for focusing a slow electron beam.

It should be understood that the photocathode or screen 34a may be of photoconductive or photovoltaic type. FIGURE 1A illustrates the photoconductive type of the photocathode 34A which comprises a light-transparent conducting layer 34a and a photoconductive layer 34C. The photoconductive layer 34C may be of various sulphides, selenides, especially those containing zinc, cadmium or lead, of oxides such as PbO, CaO or ZnO, of tellurides, antimonides, especially containing indium or of compounds of titanium, such as barium or lead titanates. In some cases a mixture of two or more of aforesaid elements will produce better results. In some cases various activators like Cu or S are added to the layer 34C to modify its characteristics. It should be understood that the photoconductive layer 34C may be an evaporated layer, sintered layer, a layer embedded in a plastic, a crystalline layer, a mosaic of crystals or a single crystal. In some cases a light-transparent dielectric layer may be provided between the layer 34a and 34C. The photocathode 34A may be of convex shape or of a planar shape. Furthermore, the layer 34a may be mounted on the side of the photoconductive layer 34C which faces the electron beam. In addition the conducting layer 34a should be in some cases connected to a source of an electrical potential to provide a biasing electrical field across the layer 34C. The remaining parts of the tube 16B are the same as of the tube 16b.

The light image of the examined part is projected by the optical system on the photocathode 34 of the vacuum tube 16b. The light image produces emission of photoelectrons from the layer 34c. As a result, a positive charge image having the pattern of said light image is left on the photoemissive mosaic 34c. Both vacuum tubes 16a and 16b are held in opposition to each other and in such a manner that the fluorescent screen 31 of the vacuum tube 16a is adjacent to the photoemissive electrode 33 of the tube 16b. The scanning electron beam 29 impinging on the fluorescent screen 31 produces a light spot at each point of its impingement. The scanning illumination excites the photoemissive electrode 33 and produces thereby a fine scanning beam of photelectrons 33a. The photoelectron beam 33a is of the scanning type because it is produced by the scanning electron beam 29. The photoelectron beam 33a may be further focused by electrostatic fields 23. In this construction it is preferable to use focusing fields because the separation of the fluorescent screen 31 from the photoemissive electrode 33 by the thickness of the wall of the vacuum tubes 16 and 16b causes certain unsharpness of the photoelectron beam 33. The electron beam 33a may be of high velocity such as used in the iconoscope type of television pick-up tubes or may be of a slow velocity. In this embodiment of my invention, I use the slow scanning electron beam. It is to be understood, however, that the fast scanning electron beam may be used in my invention as well. The electron beam 33a scanning across the charge image stored in the mosaic 34c converts said image into electrical signals which appear at the signal plate 34a. These electrical signals can be converted into video signals over the resistance in the manner well known in the art. The video signals are transmitted by the flexible coaxial cable 43 from the intrascope within the examined part to the video amplifiers 43a outside of said part. The amplified signals are transmitted from the amplifiers to the viewing tube of kinescope type 37 and are reconstructed therein into the visible image representing the image of the examined part. The viewing tube may be of kinescope type and does not have to be described in detail as it is well known in the art. The examined part will appear on the fluorescent screen 37a of the viewing tube where it can be inspected by many examiners. Transmission of the image from the amplifier 43a to the viewing tube can be done by coaxial cable 43 or by high frequency waves. The image can be sent, therefore, not only to the immediate but also to the remote receivers or may be transmitted to multiple independent viewing tubes for the benefit of many examiners, which was one of the objectives of this invention. The image on the viewing tube 37 may also be photographed simultaneously with the intrascopic examination in order to make a permanent record, which was another purpose of this invention. It should be understood that the electrical signals from the pick-up tube may be fed into various utilization circuits instead of into image reproducing receivers.

The contrast of the reproduced image may be changed, diminished or increased according to the needs of particular examination by using amplifiers provided with variable mu tubes, or by the use of kinescope in which gamma can be controlled. The signal to noise ratio of this system and therefore the definition of the reproduced image may be improved by using in amplifiers discrimination circuits which reject signals below the predetermined amplitude and eliminate therefore most of the noise signals. The coaxial cable 43 within the examined part may be encased in the above-described means 26 or 26a for inserting intrascope or may be attached to them.

The voltages for the operation of the tubes 16a and 16b are supplied through the flexible electrical wires 8a from the source of the electrical power 9 outside of the examination. In this same way the horizontal and vertical synchronizing circuits, focusing fields and deflecting circuits are supplied with electrical energy from the outside source of power 9. The synchronizing circuits are not described in detail as they are well known in the art and it is believed they would only complicate the drawings. In some cases the coaxial cable maybe outside of said inserting means 26 or 26a.

Another modification of the tube 16b is shown in FIGURE 1B. The tube 16B' has a composite photocathode 34B. FIGURE 1B shows a vacuum tube provided with one composite image-sensitive screen. The photocathode or screen 34B has a photoemissive layer 123, a dielectric layer 124, a photoconductive layer 125 and a transparent conducting layer 126. The image of the examined part is formed in the mosaic layer 123. The image sensitive screen 122 is illuminated by the fluing spot from the tube 16a through the light transparent layer 126. The scanning illumination changes the conductivity of the layer 125 and converts thereby the electrical pattern stored in layer 123 into successive electrical signals corresponding to the image of the examined part. The electrical signals are conducted to the receivers outside of the examined part where they are reconverted into visible images in the manner well known in the television art. It should be understood that electrical signals may also be fed into different utilization circuits, such as using an "absorption negative," which are well known in non-destructive testing in industry.

Another modification of the tube 16b in which a photoconductive photocathode is used instead of a photoemissive photocathode 34, is shown in FIGURE 1C. The tube 16C comprises only photocathode 34A which may be of convex or planar shape. The materials for the photocathode 34A were described above. In some cases the photocathode 34A may have two different photoconductive layers, such as layers 125 and 125a adjacent to each other. The layers 125 and 125a are preferably separated by a light impervious layer.

In some cases the composite photocathode or screen described in FIGURE 1C may have a construction in which both photoemissive and photoconductive layers are used. Such a photocathode will have a mosaic photoemissive layer on the side exposed to the image forming radiation, a photoconductive layer, and a light transparent conducting layer on the side facing the source of scanning illumination. The image of the examined part is received by the mosaic layer and is converted into a charge image. The scanning illumination converts said stored charge image into successive electrical signals which are taken off the conducting layer.

Another embodiment of the image sensitive pick-up element is shown in FIGURE 1D. In this embodiment the image sensitive element is not a vacuum tube but a solid screen 127 which comprises two photoconductive layers 125 and 125a and light transparent conducting layers 128 and 129, such as of cadmium, oxide, tin oxide, tin chloride or of noble metals, adjacent to the photoconductive layers on either side of the screen. The image of the examined part is projected on one side of said screen 127 and is converted into an electrical pattern of electrical conductivity changes in the layer 125. The flying light spot conducted by the light image conductor 114 is projected on the opposite side of screen 127, produces an increase of electrical conductivity of the layers 125a, and converts thereby the electrical pattern in layer 125 into successive electrical signals. The electrical signals are conducted to the receivers outside of the examined part and may be reproduced as visible images in the manner well known in the television art. In addition, the electrical signals may be fed into various utilization circuits and may actuate various devices as it is known in the industrial sorting or testing of materials. In some cases it is preferable to place a light opaque layer 125b between the photoconductive layers 125 and 125a. Furthermore it is advisable to connect the layers 125 and 125a to the terminals of a source of an electrical potential to provide a biasing field across said layers. Suitable photoconductive materials for layer 125 or 125a are selenides as of sulphides of lead, cadmium or tellurium, oxides such as lead oxide or zinc oxide, antimonides, especially indium antimonide, and titanium compounds such as barium or lead titanates. It should be understood that all these materials may be used as evaporated layers, sintered layers, mosaic layers, layers embedded in plastic, single crystals or a mosaic of crystals. The layers 128 and 125 may be continuous or in the form of a mesh screen or a grid.

It should be understood that the relative position of the flying spot kinescope such as 16a and of the image sensitive member, such as 16b, 16b', or 127 or any modifications thereof, may be reversed. This means that in some cases the flying spot kinescope instead of being situated proximally in relation to the image sensitive member is now situated distally in relation to the image sensitive member.

The housing 14 containing the television camera can be rotated in its position in the intrascope so that the optical system 15 can be made to face the window 18 or 18a and to "see" thereby various areas of the circumference of the examined part. The rotation of the camera can be accomplished by means of a pusher 15a which fits into extensions 10b of the box 14. The rotation of the camera may be preferable in some cases to the rotation of the whole intrascope which allows the accomplishment of the same purpose.

The main rigid portion of the flexible intrascope is the television camera 16. Therefore the shorter the television camera is, the easier it will be for the intrascope to pass through sharply angulated or curved passages. One of the advantages of the novel pick-up tube 16 is that it makes it possible to break up the smallest pick-up tube into two component parts such as tubes 16a and 16b and introduce each of said tubes into the examined part separately, reducing thereby considerably the rigid portion of the intrascope which is due to the television camera, as shown in FIGURE 1a.

To accomplish these objectives, the flexible intrascope 1a is introduced first into the examined part while containing only the box 5 housing the light source 7. Inside of the intrascope 1a, proximally to the box 5, there is a ring-like partition which serves as a stop 27 for the pick-up tube 16b which is to be introduced later. It is obvious that the shape of this stop may vary. The rest of the intrascope 1a is empty. The intrascope 1a is introduced first into the examined part. As the only rigid part in the intrascope is now the box 5, which is very small, this intrascope can easily pass even through very narrow and curved passages. After the intrascope 1a has been introduced into the examined part for a desired distance, which can be read easily on the markings provided on the outside wall of the intrascope, the next step begins. Now the housing box 14b, in which the vacuum pick-up tube 16b is mounted, is introduced into the intrascope. The housing box 14b is pushed into the intrascope until it reaches the stop 27, which can be also ascertained by the X-ray control. The box 14b may be held against the stop 27 by spring extensions 27a on said stop 27. The housing box 14b may be pushed into its position by a flexible elastic guide 15a, which is fitted into the proximal end of the housing box 14a. For this purpose the housing box 14b is provided with a ring-like extension 10a at its base as shown in FIGURE 1a, which has spring-like properties. The head of the flexible pusher 15a fits into this extension and is kept in position by it. The flexible pusher 15a may also be provided with electrical coils 6a at its distal end, which is adjacent to the element to be introduced into the intrascope. The coils 6a are connected to the source of electrical power situated outside of the examined part. In this way the head of the pusher may be given electromagnetic properties by closing the circuit, energizing the said coils 6a. The pusher 15a will be held, therefore, in the elements to be introduced into the intrascope, such as boxes 14a, 14b or the optical system 15, not only by the mechanical pressure of the extensions 10a or 10b but by magnetic attraction as well. When the pusher 15a is to be withdrawn, the current supplying the coils 6a is shut off. To facilitate the guiding of the box 14b into the intrascope, a set of threads 86 may be used, which are at the end attached to the stop 27 and which are threaded through the perforations in the extensions 87 of the house box 14b. After the box 14b has been introduced into its proper position, the intrascope, the pusher 15a, is removed. Another set of threads 89 is attached to the extensions 88 in the housing unit 14b and serves to pull out said box 14b to the exterior of the examined part when the examination is finished. This arrangement is shown in FIGURE 1b.

The housing box may be omitted in some cases and the tube 16b may be introduced into the intrascope without any housing and will be held in position by the same means as described above for holding the box 14b.

After the box 14b with the tube 16b has been introduced, the box 14a housing the tube 16a is introduced now into the intrascope in a similar manner as was described above. Both boxes 14b and 14a have openings at their proximal and distal ends respectively, which makes it possible to bring the fluorescent screen 31 of the tube 16a in close apposition to the photoemissive electrode 33 in the tube 16b. The boxes 14a and 14b are provided with mechanical means for securing a good contact of the proximal end of the tube 16b with the distal end of the tube 16a. One way of providing such a contact is to make the compartment 14a fit inside of the spring-like flange 27a at the proximal end of the compartment 14b. The housing box 14a contains vacuum tube 16a which has been described above. The housing box 14a is provided with spring-like extensions 10b which serve to accommodate the head of the pushing guide 15a.

The housing box 14a is pushed into the intrascope until it reaches the position of the stop 27b. This can also be checked by the X-ray control. The stop 27b is so situated that when the housing box 14a reaches it, the tubes 16a and 16b will be in apposition to each other. In some cases flexible coils, which can be converted into magnets by possing through them an alternating current from an outside source of electrical power, may be provided on the stops 27 and 27b or at extensions 10a or 10b of the intrascope to help the positioning of boxes 14a and 14b. In this way the rigid portion of the intrascope, which has to pass through a narrow passage or acute curvature, is now only a fraction of the rigid part of intrascopes, which use even the smallest pickup tube of conventional type. This represents an important improvement as it makes it possible to introduce the intrascope into parts which were not accessible previously to examination. In case the size of the pick-up tube is not of critical importance, one of standard television tubes, after being miniaturized, may be used as well.

The size of the kinescope tube 16a may be reduced considerably if it can be operated at a low voltage and produce at said low voltage sufficient illumination of the electrode 33. One way of accomplishing this purpose is disclosed in my U.S. Patent No. 2,586,391 which discloses amplifying screen consisting of a light reflecting layer, a fluorescent layer, a light transparent separating layer and a photoemissive layer. Said screen is disposed in the kinescope between the electron gun and the fluorescent image reproducing screen. The same objective may also be obtained by using between the electron gun and the image reproducing screen a secondary electron emissive electrode, which may be of a solid type or preferably of mesh screen, is of material having a high secondary electron emission ratio, such as Ag:Mg or it may have deposited on a mesh screen a layer of a highly electron emissive material, such as of CsO or of CaSb. As 6–10 electrons may be emitted by said screen for each incident electron, the voltage of the kinescope may be considerably reduced. The electron-optical field between said secondary electron-emissive electrode and the fluorescent screen 31 will focus the divergent secondary electrons into fine beams so that the definition of the image will not be markedly impaired.

There are certain drawbacks in the intrascope 1 or 1a described above. The separation of the fluorescent screen 31 from the photoemissive electrode 33 by the thickness of the wall of the vacuum tube 16a and of the tube 16b causes some unsharpness of the photoelectron beam 33a. This unsharpness is due to diffusion of light spot from fluorescent screen 31 as it travels through distance equal to the thickness of the walls of the tubes 16a and 16b. By the time the light spot reaches the photoemissive electrode 33, it has spread so that it cannot produce any more a fine photoelectron beam. Besides the fluorescent light spot suffers in the glass walls of the tubes 16a and 16b multiple internal reflections so that part of the fluorescent light will be scattered and will strike different separated areas of the electrode 33 reducing thereby further definition and contrast. Furthermore, it is not always possible to introduce component parts of intrascope separately as was described before. In some examinations, the time available is very limited so that intrascope must be ready for the use as soon as possible. In such cases, another modification of my invention is more suitable. This embodiment 1b of the intrascope is shown in FIGURE 2. In this embodiment of invention, the tubes 16a and 16b are replaced by one vacuum tube 16c having a composite target 19 described below. The fluorescent layer 31b of phosphors described above is deposited on one side of a very thin light transparent separating partition 19a, whereas the photoemissive layer 33b of one of the materials described above is deposited on the opposite side of said partition. The partition 19a may be of mica, glass, or of a suitable plastic and should preferably be very thin, such as of the order of a fraction of millimeter in order not to impair definition of images produced by the said television pick-up tube. Better results may be obtained if the partition 19a is conductive. This may be accomplished by using for the partition a conductive material or by coating the partition on the side, which supports the photoemissive layer, with a light transparent conducting layer, such as is known in the trade under the name of "Nesa," indium compounds or of cadmium compounds. In some cases the composite target 19 may be deposited on the photocathode 34 instead of being supported by the side walls of said pick-up tube. In this event the separating layer 19a may preferably be reduced to the thickness of a fraction of one micron.

The partition 19a may be placed in its position within the tube 16c by means of a metallic ring 98 having a flange 99 which supports the partition, whereas the ring itself is attached to the walls of the tube. The cross-sectional perspective view of the ring 98 and partition 19a is shown in FIGURES 2d and 2e. Instead of a metallic ring 98, the transparent separating layer 19a, the fluorescent layer 31 and photoemissive layer 33b may also be supported by the mesh screen of conducting or insulating material 82 as shown in the pick-up tube 16d and 16e and 16e' illustrated in FIGURES 2a, 2b and 2c. Instead of a mesh screen a supporting layer of continuous type may be used and may be made of one of the materials used for the separating layer 19a which are either light transparent or electron transparent. In some cases it is preferable to make the fluorescent layer 31b and the photoemissive layer 33b of semi-spherical curved shape. In some cases the separating partition 19a may be omitted and the fluorescent layer 31b and photoemissive electrode 33b are both supported by the mesh screen 82 or by supporting element of continuous type 19a without any separating layer. This arrangement is possible only in cases in which the photoemissive layer 33b and fluorescent layer 31b do not inactivate each other and the photoemissive layer 33b is conductive. The other elements of the novel pick-up tubes 16c, 16d and 16e are the same as described above. At one end of the tube 16c there is disposed an electron gun 28 which produces an electron beam 29. The electron beam 29 is focused by electrostatic field 30 and is deflected by electrostatic plates 30a and 30b in two perpendicular to each other planes. The electrostatic plates are energized by signals from saw-tooth generators 32 which are situated outside of the examined part. The generators 32 are connected with electrostatic plates 30a and 30b by means of flexible wires. In this way the electron beam 29 is made to scan the fluorescent layer 31a of the composite target 19 in a regular television raster. The fluorescent layer 31b may also be provided with an electron transparent metallic conducting backing layer 31a such as of aluminum. The fluorescent scanning light spot produces a scanning photoelectron beam from the photoemissive electrode 33b which may be of CsOAg or of caesium, lithium or rubidium on antimony, arsenic or bismuth. At the opposite end of the vacuum tube 16c there is provided photocathode 34 which consists of a light transparent signal plate 34a, a light transparent insulating layer 34b and of a photoemissive mosaic 34c. The signal plate 34a may be a thin transparent layer of metal or other conducting material. The insulating layer 34b may be of mica or other transparent dielectric material and photoemissive mosaic 34c may be of CsOAg or of caesium, rubidium or lithium on antimony, arsenic or bismuth, as was described above.

In some cases it is preferable to focus the scanning electron beam 33a on the photocathode 34. The focusing has to be done by means of electrostatic field 30a. In such event the photocathode 34 or its photoemissive mosaic 34c should be preferably of curved semi-spherical shape. The rest of the operation of the intrascope 1b using the television camera 16c is the same as was described above. A considerable improvement in definition of reproduced images may be achieved by making the fluorescent screen 31 of grainless phosphors.

The housing box may be omitted in some cases and the television tube may be introduced into the intrascope without any housing and will be held then in position by the same means as were described above for holding the housing box.

In some cases the part to be examined is too small or too curved to accommodate even the television camera 16. For example the introduction of the intrascope 1a through narrow passages may be in some cases accomplished because of separate two-step insertion of the tubes 16a and 16b, but their subsequent assembling together inside of the intrascope proves to be impossible because of the lack of sufficient space. In such cases, it may be necessary to keep the tubes 16a and 16b apart from each other and to use an optical system 15c to focus the scanning illumination produced by the tube 16a on the photoemissive electrode 33 in the tube 16b, as shown in intrascope 1c, illustrated in FIGURE 3.

In some cases the optical system 15c may be housed in the compartment 14b. In other cases it may be placed preferably in compartment 14a. It must be added that the use of the optical system 15c makes it necessary to increase the output of light from the fluorescent screen 31, as only 2% of the light will now reach the photoemissive electrode 33. The rest of the operation of the intrascope 1c is the same as was described above for the intrascope 1 or 1a.

This arrangement will be useful in locations which are known in advance as not to cause any bending of the intrascope in the area between said tubes 16a and 16b. It may be also of value in the examination of parts where the degree of such angulation between the tubes 16a and 16b is known in advance so that it may be overcome by the choice of a suitable optical system.

In order to reduce pin-cushion distortion inherent in electrostatic deflection system used in cameras described above and illustrated in FIGURES 1 to 3, I make the fluorescent screen of a semi-spherical shape. Futhermore, the photoemissive electrode 33 may be preferably also shaped semi spherically to reduce further pin-cushion effects. In addition the photocathode 34 of the pick-up tube may also preferably have a curved semi-spherical shape which will help overcome further distortion due to electrostatic focusing field 30a. The use in combination of a curved fluorescent screen 31 and of a curved photocathode 34 represents an important improvement of my camera over devices of the prior art. The definition of the flying light spot may be considerably improved by depositing screen 31 on a supporting mesh screen 83 which was described above, instead of on the wall of the tube 16.

In case extremely bright images have to be investigated the photocathode 34 of the pick-up tubes described above may be provided with a layer of phosphor on the side facing said image, which converts the radiation of strong intensity into a fluorescence or phosphorescence of weak intensity, so that the pick-up tube will not be damaged by excessive illumination. Such phosphors are well known in the art. Therefore it is believed that their description is not necessary.

In some cases it is preferable to reduce further the rigid part of the intrascope by providing the source of image forming radiation outside of the intrascope. This embodiment of my invention is shown in FIGURE 5.

The photocathode of the pick-up tube 16b₂ may also be made to provide a panoramic view of the examined part. The photocathode 34e' in this modification extends in a curved semi-spherical manner to the side walls of the pick-up tube, as shown in FIGURE 5. One window 12a in this modification is preferably situated at the end of the intrascope.

The novel intrascope 1 or 1a may be further simplified as shown in FIGURE 4. In this embodiment of my invention only one novel pick-up tube 16f is used. The pick-up tube 16f has a photoemissive photocathode 34g which consists of a layer 34a transparent to image forming radiation, a dielectric layer 34b, also transparent to the image forming radiation, and photo-emissive mosaic 34c. In a close spacing from the photocathode 34g, such as not exceeding 0.25 millimeter but preferably much smaller, there is disposed a fluorescent screen 34e. The screen 34e may be supported by a light transparent supporting layer such as of mica or may be supported by a mesh screen 82 as was described above. The fluorescent screen 34e may be in some cases provided with an electron transparent light reflecting conducting layer 34f on the side facing the electron gun 28. In some cases, said fluorescent layer 34e and backing layer 34f may be deposited on the photoemissive mosaic 34c, as shown in FIGURE 4. In such event a light transparent separating layer 34d may be preferably interposed between said photoemissive and fluorescent layers. At the other end of the tube there is disposed an electron gun 28 which produces an electron beam 29 for scanning said fluorescent layer 34g in television raster. The image of the examined part is projected on said composite photocathode 34g and produces a charge image in the photoemissive mosaic 34c, which has the pattern of said projected image. The scanning electron beam produces scanning light spot in the fluorescent layer 34e. The light spot scans the adjacent photoemissive layer 34c. The impingement of the light spot causes photoemission of electrons which is modulated by the charge image established in the mosaic 34c by the projected previously image of the examined part. The signals produced by the scanning light spot appear at the signal plate 34a and can be converted over suitable resistor into video signals in the manner well known in the television art. The light transparent separating layer 34d is necessary to prevent detrimental chemical interaction between the photoemissive layer 34c and fluorescent layer 34e. In order to preserve sharpness of the scanning light spot, said separating layer must not exceed 0.15 millimeter in thickness. The layer 34d may be dielectric, such as of mica, non-conductive glass or plastics. In some cases it is preferable to use a conductive layer and in such event the separating layer may be of glass, mica, plastics coated with the material known as "Nesa" manufactured by Pittsburgh Plate Glass Company. It may also be made of tin salts, such as halides or oxides, cadmium salts or metal powders, such as of silver. In some cases it is preferable to make the separating layer of the two layers adjacent to each other, one of them being an insulating or semi-conducting layer, another one being a conducting layer. It is obvious that the composite photocathode 34g may be deposited on the wall of the vacuum tube or may be held by supporting means within the vacuum tube independently of the end walls of said tube. Such supporting means may be either in the form of mesh screen or of a continuous element which were both described above. The fluorescent layer 34e must be of phosphors having a very short persistence, such as of the order of 1 microsecond, which were described above. The electron transparent layer 34f serves to improve efficiency of the light output from the fluorescent layer 34e and may be of aluminum. In some cases it may be omitted.

This system may also be used in the way shown in the intrascope 1a which has optical system between pick-up tube 16a and tube 16b and it is shown in FIGURE 4a. In such case the novel pick-up tube 16b' has the mosaic photocathode 34 described above but the electrode 33 is eliminated; see FIGURE 4a. The scanning of charge image produced on the photoemissive mosaic 34c is accomplished by the fluorescent light spot from the tube 16a' which is projected on the mosaic 34c by lens 15c. The impingement of the flying light spot which scans the photocathode 34 in television raster produces photoemission from the layer 34c, which is modulated by charge image present thereon. As a result successive electrical signals are formed which can be taken off the signal plate 34a and can be converted into video signals in the manner well known in the art.

This novel television camera can also be used by placing the novel tube 16b' in close apposition to the tube 16a'; see FIGURE 4b.

The fluorescent screen 34e if made of a curved semispherical shape will help to reduce pin-cushion distinction inherent in electrostatic deflection system. In addition the photocathode of the pick-up tube 16b' may also preferably have a curved semi-spherical shape which will help overcome further distortion due to electrostatic scanning. The use in combination of a curved fluorescent screen and of a curved photocathode represents an important improvement of my camera.

The intrascope illustrated in FIGURES 4, 4a and 4b may also be simplified by providing the source of image forming radiation outside of the intrascope as was explained above.

In case a true color image of the examined part is wanted, a rotating color wheel 50, drum, or truncated cone, composed of plural, e.g., three primary chromatic filters 51, 52 and 53, is placed before the television pick-up tube 16b; see FIGURE 6. A similar wheel 50a rotating synchronously with the first color wheel 50 is placed in front of the picture tube 37 in the receiver. Each examined field is scanned and reproduced in succession through a different primary color in the filter wheel. Therefore, three colored images, red, yellow and blue are projected on the final viewing screen 56 in 1/40 second. The persistence of vision lasts longer than 1/40 of a second. Therefore, these three color images fuse in the mind of the observer and a multi-colored reproduction 57 corresponding to the true colors of the examined part results. The color wheels 50 and 50a are driven by induction motor located outside of the examined part, synchronized by synchronization stage which compares the incoming pulses with locally generated ones and thereby controls the speed and the phase of the disc. Since the color wheels synchronization is obtained from the video wave form, the phasing of the color filters is automatically selected, that is, a given color automatically appears before the receiver tube when that color is present before the pick-up tube, as it is well known in television art. The motor may also be located in the examined part.

The illuminating system 5 in this modification of the introscope is the same as described above and shown in FIGURE 1. The mounting of the illuminating system also may be the same as shown in FIGURE 1. The optical system 15 is essentially the same as described above and shown in FIGURE 1. In some cases additional lenses may be used between the rotating wheel 50 and the television pick-tube 16b, 16f or any other pick-up tube described above for a better focusing of the image of the examined part on the photocathode of the pick-up tube. The mounting of the optical system may be the same as shown in FIGURE 1. The rotating color wheel 50 in front of the television pick-up tube has three sections of colored glass corresponding to three basic chromatic values such as red 51, blue 52 and yellow 53, and may be mounted on the bracket 59. The rotating wheel is activated by the synchronous motor situated outside of the examined part and connected to the wheel by means of the flexible insulated cable.

The image of the examined part is projected by the optical system onto the photocathode of the television pick-up tube through the rotating multicolor wheel 50 and is converted by said television pick-up tube into video signals having the pattern of the examined part in the same way as was explained above. The video signals are transmitted by the flexible co-axial cable to the amplifier outside of the examined part. The amplified video signals are conducted by the coaxial cable to the viewing tube 37 of the kinescope type. The video signals modulate the scanning beam 60 of the kinescope 37. The modulated scanning beam in the kinescope striking the fluorescent screen 61 of the kinescope is reproducing the images of the examined part. These images are projected through the color wheel 50a rotating synchronously with the similar color wheel 50 in front of the pick-up tube. In this way three colored images of the examined part are projected on the final screen 56 in 1/40 of a second, blending thereby into one multicolored image due to persistence of the vision of the observer. The resulting multicolored images 57 can be visually examined on the screen 56 or may be recorded. It is obvious that with all intrascopes described above this color system may be used.

Instead of a rotating color disc or drum the color images may be produced by using sequentially three sources of illumination, such as a source of red light, a source of yellow light and a source of blue light. First the red light, for example, is flashed on the examined object and the "red image" is produced thereby and is transmitted to receivers. Next the yellow light is flashed on and the "yellow image" is produced and transmitted to receivers. Next the blue light is flashed on the examined object and the "blue image" is produced and transmitted to receivers. If the red, yellow and blue images are all produced in 1/40 of a second, they will blend in Examiner's eye into a multicolor image without the use of any rotating color filters.

In some cases the use of the rotating color disc, drum or truncated cone may not be convenient and a system using a stationary color filter may be preferable. It is obvious that the rotating color disc may be replaced by stationary color filters such as dichroic mirrors, but in such case two or three pick-up tubes must be provided in the intrascope. It is to be understood that all such color television systems come also within the scope of my invention. In order to use a stationary color filter with one pick-up tube only it is necessary to split the image by suitable optical means into plural, e.g., two or three images and to project said split images through the stationary color filter on separate areas of the photocathode. This embodiment of my invention is shown in FIGURE 7. The image 64 of the examined part is projected by lens 65 between two mirrors 66 and 67. The mirrors are parallel to each other and equidistant from the optical axis. The mirrors produce from the original image 64 multiple secondary images such as 64a, 64b, 64c, etc. The lens 65a projects the image 64 and the secondary image 64a and 64b on the different areas A, B and C of the photocathode 68 of the pick-up tube, which may be of any type described above. There are many optical systems for splitting the image of the examined part into plural symmetrical images, which are well known in the art; see U.S. Patents Nos. 2,389,646 and 2,465,652, and it is to be understood that the description of such an optical system used in my intrascope should be considered only in an illustrative and not in a limiting way.

Each photocathode 68 has signal plate 69, dielectric layer 70 and photoemissive mosaic layer 71, as was described above. Three symmetrical images are projected on different areas, A, B and C of the photocathode without overlapping each other. The stationary color filter having plural elements, such as the red one 67, the yellow one 67a, and the blue one 67b, are provided outside of the pick-up tube in cooperative relation with said three different areas A, B and C of the photocathode for receiving the original image 64 and symmetrical images 64a and 64b. The filters may also be positioned inside of the pick-up tube in front of the photocathode. Therefore the image 64a' which passes through the red filter 67 will produce in the area A image 64a' having "red" information. The image 64 which passes through the yellow filter 67a will produce in the area B image 64' providing "yellow" information, and the image 64b produced by the filter 67b will form in area C image 61b', which provides "blue" information. The scanning electron beam 33a produced by the flying spot light, as explained above, scans these images on the photocathode and produces video signals having the pattern of said "red," "yellow" and "blue" images. When the area A of the photocathode is scanned video signals are produced which after amplification and improvement of their contrast are fed into "red" kinescope. Next the electron beam 33a scans the area B and image 64' and converts said image into video signals. These video signals correspond to the "yellow" image 64' and are fed into "yellow" kinescope. In the same way the video signals corresponding to the "blue" image 64b' are fed into the "blue" kinescope. It is obvious that instead of multiple kinescopes a single tricolor kinescope may be used as well. It is also evident that the scanning of the charge images on the photocathode does not have to proceed systematically from the area A to area B but also may be completely interlaced. The basic feature of all these arrangements is that video signals derived from the scanning of the area A of the photocathode have to be fed into "red" channel, the signals produced by scanning area B of the photocathode have to be fed into "yellow" channel and signals from area C should be fed into "blue" channel.

It is obvious that there are many systems which can produce plural non-overlapping images and it is to be understood that all such systems come within the scope of this invention. It is also obvious that optical means or filters may be used to split not the whole image simultaneously into plural symmetrical images but to split each line of the image into three non-overlapping line images. These line images may be projected through multicolor filter to produce non-overlapping color line images. Each of said lines will then be scanned and converted into "red," "yellow" and "blue" video signals, as was explained above.

The television camera of the type shown in FIGS. 4, 4a and 4b can also be used in this novel color television intrascope. FIG. 7a shows the use of the pick-up tube 16g for producing color images. It is obvious that the same system may be used with pick-up tubes 16b' or 16b₂. The novel pick-up tube 16g has a mosaic photocathode 76 which consists of a light transparent conducting layer 76a, light transparent dielectric layer 76b and of photoemissive mosaic layer 76c. The above mentioned layers may be of the materials described above. The photocathode 76 may be divided into plural areas such as three independent from each other photocathodes, as was shown in FIG. 7. This may be accomplished also by the insulating means which extend from the conducting layer 76a into photoemissive layer 76c. In another modification instead of this plural photocathode, three independent photocathodes may be deposited on the walls of the pick-up tube or may be mounted in the inside of said pick-up tube in such a manner that the edges of said photocathodes do not come in contact with each other. In the preferred form of this system, the optical projection of split images is of such a manner that said images do not overlap each other on the photocathode but fall in three separate areas A, B and C. In such case, only the signal plate 76a has to be divided into three different areas such as 76A, 76B and 76C which are insulated from each other or are noncontiguous to each other. In order to be able to transmit "red" video signals only to the "red" channel, "yellow" video signals only to the "yellow" channel and "blue" video signals only to the "blue" channel in this modification, the photoemissive mosaic 76c and its dielectric layer 76b do not have to be split any more into independent non-contiguous units. By the use of one of the optical systems described above, the image of the examined part is split into three separate images which are projected on three separate areas 76A, 76B and 76C. Each of the conducting signal plates of said photocathodes is connected to its own color channel only. In this way the signals from the signal plate 76A will be, for example, directed to the "red" kinescope, the signals from the signal plate 76B to the "yellow" kinescope and signals from the signal plate 76C will be fed into the "blue" kinescope.

Another way to produce color images is to subject various areas A, B and C of the photocathode or the scanning beam to modulation by signals of different frequencies from an outside generator and by making each primary color channel responsive only to one frequency which is made arbitrarily representative of said primary color. In this way the "red," "yellow" and "blue" images will be fed into "red," "yellow" and "blue" channels respectively by means of appropriate filters or decoders. This arrangement allows the use of one signal plate instead of three signal plates in the systems described above.

My invention is not limited to visible light images. It should be understood that my intrascope may be made responsive to invisible images on either side of visible spectrum by using appropriate photosensitive layer in the photocathode of the television camera. It is to be understood also that my intrascope may serve for receiving images formed not only by various electromagnetic radiations, such as ultra-violet, infra-red, etc. but also by particles radiation such as neutrons, alpha particles, protons, electrons or by ions. In such case, the photocathode of the pick-up tube described above may be provided with an atomic particle sensitive phosphor on the side facing said image or may have a special electron or other atomic particles emissive photocathode.

FIGURE 8 shows a pick-up tube 16h having atomic particles sensitive photocathode which is responsive to an atomic particles image and emits secondary atomic particles having the pattern of said image. It is to be understood that the photocathode 77 is shown only for illustration as there are many types of photocathodes sensitive to atomic particles, as evidenced by my above mentioned patents. The target 78 is scanned by a slow electron beam 33a from the electrode 33 in the manner described above. The electrons of the scanning beam 33a are deposited on the dielectric layer 79 of the target and are stored there. At the time if impingement of the beam of gamma rays or of atomic particles from the photocathode 77, the dielectric layer 79 becomes conductive. The electrons of the scanning beam 33a can now pass through the dielectric layer 79 to the signal plate 80 and produce video signals. In some cases the photocathode 77 may be in apposition with the target 78.

The above described type of pick-up tube may also operate using a fast scanning electron beam instead of a slow beam. This modification is preferable in cases in which the particles emitted by the photocathode 77 have small velocity, for example, in case of a photoemissive cathode. In such case the signal plate 80 should be on the side of the target 79 which faces the scanning electrode 33. The rest of the operation of this intrascope may be the same as described above.

The storage target may also be of the composite type and may consist of a fluorescent light reflecting layer 81, a fluorescent layer 81a, a light transparent dielectric layer 81b, such as of mica, glass or silica, and a photoemissive mosaic layer 81a, as shown in FIG. 8a. In some cases the photocathode 77 and the composite storage target 83 may be in apposition to each other, which means contiguous to each other. In some applications the storage target 83 may also be used instead of the photocathode 77 and will serve to receive an image of invisible radiation and to convert said image into a charge image. Also the target 78 may serve as a photocathode; see FIG. 8b.

Furthermore, my intrascope may serve for investigating images produced by supersonic radiation. In such case, the photocathode of the pick-up tubes described above is replaced by the supersonic sensitive photocathode, for example, of quartz, compounds of titanium, such as barium titanate or lead titanate, or Rochelle salt or ADP. The intrascope must have at its distal end a membrane and must also have a medium to transmit supersonic vibrations to pick-up tube. Instead of a membrane, the end-wall of pick-up tube may form the end of intrascope and will then receive supersonic image directly.

When using an invisible radiation for producing an image of the examined part, the color reproduction of said image may also be obtained, as it is explained in my U.S. Patent No. 2,593,925. Another system for color reproduction of invisible radiation images is to make separate sub-photocathodes A, B and C, as described above, selectively sensitive to different groups of frequencies present in said invisible radiation image. For example, sub-photocathode A may be made to receive radiation only of wavelength 3–4000 A. either by means of a special selective filter in front of said sub-photocathode or by making the photosensitive surface selectively responsive only to said wavelength. In the same manner the sub-photocathode B will receive only radiation of 1000–2000 A. It is obvious that the wavelengths quoted above should be considered only in an illustrative and not in a limiting sense. In the same manner radiation on the far end of the spectrum may be arbitrarily divided in various groups of frequencies. By assigning arbitrarily three color channels, such as "red," "yellow" and "blue" to said three sub-photocathodes, a multicolor reproduction of an invisible image may be obtained. Also, the rotating color disc or drum which is provided instead of visible color filters with filters selective for various frequencies present in the invisible image may be used for the same purpose. This modification will then allow the use of only one photocathode instead of three sub-photocathodes.

In many cases it is preferable to have the source of invisible light or of other image forming radiation used for examination independent of my intrascope and outside of the intrascope. In such arrangement the source of image forming radiation may be introduced prior to or subsequent to introduction of the intrascope into the examined part. This embodiment of my invention will facilitate the insertion of the intrascope as it will reduce the size of its rigid parts.

The novel television cameras described above both for invisible and visible image forming radiation operate by means of the photoemissive effect or by means of bombardment induced conductivity effect. It should be understood, however, that similar television cameras which may use a photoconductive or photovoltaic effect instead of a photoemissive effect, described above, come also within the scope of my invention.

It is evident that all intrascope used for receiving images or signals of ionizing radiations, such as gamma rays, electrons, neutrons, protons, etc. may serve to reproduce images without having any optical system. In such case the window of the intrascope is preferably situated at the distal end of the intrascope, as shown in FIGS. 5 and 6.

All the intrascopes described above may be further reduced in size by omitting the encasing and holding member 26, as shown in FIG. 5a. In this modification of my invention, the television pick-up tube may be of any of the types described above. The television pick-up tube may be inserted into the examined part by means of a flexible or semi-flexible pushing guide 15a, according to the type of the examined object. The television camera, e.g., 16e, is placed in a housing compartment 92 which is provided at its proximal end with extensions 94 for receiving the head of the guide 15a. At the other end of the housing compartment an extension is provided for the optical system 93. In some cases a semi-flexible transparent tip or a tip 90 having window 91 therein may be provided at the end of the housing 92. In some cases additional windows with lenses may preferably be added in the side walls of the housing box 92. In such event the photocathode of the pick-up tube 16e should preferable be of a panoramic type, as was shown in FIGURE 5.

The intrascopes of the type described above may be further simplified by omitting the housing box 92 and introducing television pick-up tube into the examined part without any protective compartment. In such case an extension or a socket are provided at the proximal end of the television camera to accommodate the head of the guide 15a. Another extension is provided at the distal end of the television pick-up tube to support the optical system 93.

In this modification of my intrascope the head of the pushing guide 15a may be fitted into extension at the proximal end of the camera tube in the same manner as was described above for fitting the guide 15a into extensions in the housing compartment. The pushing guide may also be screwed onto the socket mounted at the proximal end of the pick-up tube. Also, electromagnetic coils described above may preferably be used in this modification of my invention to secure a good contact.

In some applications it may be desirable to remove the guide 15a from the camera tube after its insertion. In such case the camera is provided with the threads 89 described above to pull out said tube after examination is concluded. In some applications the pick-up tube may be encased in an inflatable transparent sheath which is inflated after the insertion of intrascope.

It is obvious that all those simplified intrascopes described above may also be used for producing color images of the examined part in the manner described above. It is also to be understood that these simplified intrascopes may be used in combination with a source of an invisible radiation either of corpuscular or of undulant type. Furthermore, it is to be understood that the simplified intrascope may use pick-up devices based on the photoconductive or photovoltaic effect instead of the photoemissive effect described above.

For producing color images in some cases instead of separate signal plates, a circuit having keying amplifiers may be used as well. This circuit activates amplifiers for video signals in a predetermined time sequence so that the signals coming from the area A and representing "red" signals are amplified by amplifiers, whereas signals from the "yellow" area B and "blue" area C are not amplified and therefore are not reproduced. Next when the "yellow" area B is scanned, the amplifiers receiving "yellow" signals are activated by said keying circuits, whereas amplifiers for "red" and "blue" signals are kept inactive. The keying amplifiers are well known in the art. It is believed, therefore, that their detailed description would only serve to complicate the drawings. In some cases, equalizing circuits should be provided in addition, in order to equalize differences in signals caused by different exposure time of the area A, B and C to the image forming radiation.

It should be understood that the relative position of the flying spot kinescope, such as 16a, 112 or 109, and of the image sensitive member, such as shown in FIG. 1 or in FIG. 4a, or in FIG. 8, or in any modifications of the invention described in specification may be reversed. This means that in some cases the flying spot kinescope, instead of being situated proximally in relation to the image sensitive member is now situated distally in relation to the image sensitive member. It should be understood that such modification of the position of the elements of the endoscope comes within the scope of my invention.

In some examinations the television endoscope or intrascopes described above are still too bulky to be introduced into narrow passages or cavities. For such cases I devised a novel intrascope in which one or all of the vacuum tubes used in the intrascopes, such as television pick-up tube or image-sensitive tube or flying spot tube, also known as a kinescope tube, are constructed in such a manner that all of their sidewalls or a part of their sidewalls or their endwalls are flexible to conform to the tortuous configuration of the passages.

Reference is now made to FIGURE 9, which illustrates one of the embodiments of this invention. In this embodiment the novel flying spot kinescope 85 has flexible portions 86 and 87 in the sidewalls 88. The tube 85 has section A which houses the electron gun 90 and which is of a rigid material, such as glass, metal or a ceramic. Also the section B which houses two pairs of deflection plates 30a and 30b is of rigid material, such as glass, metal or ceramic. The endwalls 93 and 93a may also be of rigid material, such as glass, metal or ceramic. The fluorescent screen 94 with a metallic electron pervious backing layer 95 are deposited on the endwall 93. In some cases the backing layer 95, preferably may be omitted. Between the section A and the section B, the sidewall 88 has the flexible section 87. Between the section B and the endwall 93 is mounted another flexible section 86. The sections 86 and 87 are made of a flexible material which has malleability to conform to configuration of examined part. I found that the flexible sections 86 and 87 may be made of a plastic material, such as of one of fluorocarbons. In particular, I found that tetra-fluoroethylene or its derivatives, such as Teflon made by Du Pont Company of Wilmington, Del., are suitable for this purpose. I also found that polyesters, such as Mylar or Cronar manufactured by Du Pont Company of Wilmington, Del., may be used for this purpose. In addition, silicone plastics, such as Silastic, made by Dow-Corning and isocyanate plastics, such as Eccosorb AN made by Emerson and Cumming, may be useful. I discovered that these plastic materials with the exception of tetra-fluoroethylene, are slightly pervious to the air and as a result they do not maintain well vacuum in the tubes. I found, however, that this difficulty could be overcome by metallizing, such plastic materials, with a thin layer of aluminum or other metals. This metallization will not impair the flexible nature of the above described materials. It should be added that ordinary rubbers proved to be unsatisfactory for this purpose.

The flexible sections 86 and 87 are fused to the adjacent rigid parts by means of Kovar seals or by bending them with heat resistant glues, such as "Ardalit," manufactured by Ciba Company, or preferably with Du Pont fabrics and finishes Department's adhesives 4684 and 4695. When using 4695 to adhere a polyester, such as "Mylar" to the glass, the adhesive should be coated on polyester, solvents evaporated, then combined with glass at 350° F. followed sometimes by an additional 10 minutes curing at 350° F. When adhering polyesters to a metal, such as aluminum, copper, brass or steel, the above described procedure may be followed as well. The resulting bond was found to withstand flexion well. The presence of flexible sections 86 and 87 will allow the vacuum tube to conform to configuration of the passages through which the endoscope has to pass to enter the examined part. In many examinations, especially in the human body, the main difficulty resides in constricted passages which lead to the examined organ. For example, the stomach has ample room to accommodate the endoscope, but the esophagus at the junction with the stomach forms a sharp anterior angulation which has a small diameter and which can accommodate only a small rigid object. The rigid part of tube 85 is now only the electron gun which can be made small enough for the passage through the esophagus or other narrow passages. The only other rigid parts of the tube 85 are the deflecting plates 30a and 30b, which are small per se and which, furthermore, being separated from the electron gun by the flexible part 87 of the tube do not contribute any more to the length of the rigid portion of the tube.

The novel endoscope 84, shown in FIG. 10 is provided with a vacuum tube having flexible walls 86 and 87 will now be able to pass in all patients through the esophagus into the stomach, as such a vacuum tube used in my device will be able to conform to the shape of the esophagus.

The tube 85, after the passage through the esophagus or any other similar narrow passages, will be distorted in shape and will, therefore, not be able to function. For example, the electron beam from the electron gun 90 may now be directed to the sidewall 88 of the tube instead of to the fluorsecent screen 94 as shown in FIG 9a. In order to reestablish the original shape of the vacuum tube, which is essential for its operation, I use two flexible conduits 96 and 97, which are attached to the sidewalls of the vacuum tube and to the distal endwalls 93 of said vacuum tube. In some cases they should be attached also to rigid section B. The conduits 96 and 97 may be of flexible materials, such as were described above. The conduits 96 and 97 extend beyond the vacuum tube to the outside of the examined part and are connected to a source 98 of compressed air, oxygen or liquid. This source 98 is disposed outside of the examined part. When the endoscope is in the location in which there is enough space for vacuum tube to reestablish its normal configuration, the valve 99 which controls the passage of the air is opened and the pressure of the compressed air will cause straightening of the bent tube 85. Instead of the air or oxygen also a fluid under pressure may be used as well. The use of pneumatic or hydraulic means to reestablish the proper configuration of the vacuum tube represents an important feature of my invention as otherwise the whole endoscope would fail to operate. The conduits 96 and 97 are in addition provided with a valve 100 controlled openings at the distal and to provide insufflation of air or liquid into examined cavity as it may be necessary in some examinations. The valve 100 serves also as a safety outlet in case the return of fluid or air from the conduits 96 or 97 should fail. In such an accident the endoscope could not be withdrawn from the patient's body as the vacuum tube 88 would not be able to fold and to conform to the configuration of passages. By opening the valve 100, the escape of fluid or air is provided which will reestablish flexibility and malleability of the vacuum tube 85.

In some cases in which the geometric configuration of the tube is not very critical, instead of flexible conduits 96 and 97, used to reestablish the original shape of the tube, we may use flexible sections 86 and 87 made of a resilient material, which will by itself revert to the original form after the pressure by the walls of the passage is removed. I found that materials, such as silicone rubbers, manufactured by Dow-Corning Co. are suitable for this purpose.

I found that when using fluorocarbons as a plastic material for flexible sections 86 and 87, a complication arises due to escape of negative fluorine ions during the baking of the tube. These negative ions cause a fast deterioration of the fluorescent screen or of the photocathode. I found that this difficulty could be solved by providing a flexible conducting grid opposite the flexible sections 86 and 87 and which is connected to the source of a positive electrical potential during the baking of the tube and which intercepts the negative ions, or by metallizing the inner surface of plastic material by deposition of a layer of aluminum.

It should be added that the baking of the vacuum tubes having flexible sections should be preferably done at temperatures below 150° C.

The flexible conduits in some cases may be preferably attached to light transparent extensions 100a mounted on the sides of the endwall of the vacuum tube instead of being attached directly to the endwall of the vacuum tube, as shown in FIGURE 9b.

In some cases it is preferable to make the whole sidewall 88a of the vacuum tube 85 flexible instead of having a combination of rigid and flexible sections as was described above. In such case the electron gun is mounted on the endwall 93a of the tube which is of rigid material. This construction is shown in FIGURE 9c. In other cases it is necessary to make the endwall of the tube of a flexible material or to insert a flexible section into said endwall. The flexible endwall may be used in combination with a flexible sidewall or with a rigid sidewall.

It should be furthermore understood that the flexible construction of the electron tubes applies also to non-vacuum tubes, such as gas tubes, like Geiger-Muller tubes, proportional counters, ionization chambers, etc.

In some cases the pressure source 98 should be preferably located within the examined body or examined part. The pressure source 98 may be located within the endoscope or outside of endoscope. In some cases, instead of pneumatic or hydraulic means, mechanical means, such as springs or telescoping rods may be used to reestablish the shape of vacuum tube 85.

It should be furthermore understood that the novel construction of the vacuum tube described above applies not only to the kinescope type of tubes but also to all types of television pick-up tubes, one of which is illustrated in FIG. 11, or to all image sensitive vacuum tubes described in this specification, some of which are illustrated in FIGS. 1, 1A, 1B, 1C, 2a, 8b, etc.

The novel pick-up tube 110 may be of photoemissive type, photoconductive type or photovoltaic type. Suitable materials for photoemissive photocathodes are CsOAg or CsSb or other metal alkaki, such as K, Na or Rb with Sb, As, or Bi.

Suitable photoconductive materials are selenium or its compounds, sulphides of lead, cadmium or tellurium, oxides such as lead oxide or zinc oxide, antimonides, especially indium antimonide. It should be understood that all these materials may be used as evaporated layers, sintered layers, mosaic layers, layers embedded in plastic, single crystals or a mosaic of crystals.

In addition, the television pick-up tube 110 may have an image sensitive screen which combines both photoemissive and photoconductive layers. The photocathodes or screens 111 may be of continuous type or of mosaic type. The photocathodes or screens 111 may have a planar shape or may be preferably of convex shape. The scanning electron beam may be of high velocity type or of a low velocity type. In conclusion, it should be understood that all types of television pick-up tubes or of image sensitive tubes come within the scope of this invention.

The novel endoscope 84 having flexible vacuum tube 85 is shown in FIG. 10. It should be understood that the image sensitive element 16b or any of its modifications described in this specification could be constructed with partially or totally flexible sidewalls, as was described above. The remaining parts of the endoscope 84 may have construction illustrated in FIGURES 1 to 8. The image sensitive member and tube 85 may be in contact with each other.

The novel pick-up tube 110 has the photocathode 111, the deflecting plates 112 and 113 and the electron gun 117 for producing the scanning electron beam and electrostatic focusing means 23, as is well known in the television art. In addition the novel pick-up tube 110 has flexible sections 86 and 87 in the sidewalls which were described in detail above. Besides the novel pick-up tube 110 has flexible conduits 96 and 97 connected to an extraneous source of compressed gas or liquid, as was described above.

It should be understood that the novel pick-up tube 110 may have the whole sidewall 88b made of a flexible material, as was described above, and as it is shown in FIG. 12. The use of a flexible television pick-up tube 110 in the endoscope may be in some cases preferable to the use of a television system composed of two separate elements, as described above.

In another embodiment of invention, illustrated in FIG. 13, the kinescope 109 which produces the flying spot illumination of the image sensitive member 120, which may have construction of tube 16b or 16B' or 16C, or of screen 127, or of any modifications thereof, is disposed outside of the examined part and has, therefore, no limitations any longer as to its size or flexibility. The kinescope 109 has a similar construction as the flying spot kinescope 16a described above. It should be understood, however, that it can be now of magnetic or electrostatic type as it is not limited any more as to size. The flying spot light produced by the electron beam 112 is projected by a suitable optical system 113 on a flexible novel light conductor 114.

The image conductor 114 consists of multiple fibers of material having a high refractive index such as quartz, rutile or special plastics. In many applications the image conductor must be flexible and easily malleable. In such cases, acrylic plastics, such as Lucite or polystyrenes may be used. Especially Lucite is suitable for this purpose because it causes smaller losses of conducted light than other materials. Lucite and other above-mentioned materials characterized by a high refractive index have the property of internal reflection of the light conducted by them. Such materials cannot conduct a whole image as such but they can conduct well a light signal, which means an image point. The size of the image point I found is determined by the diameter of a single conducting fiber 114A. In my image conductor I assembled a bundle of such fibers which form a mosaic-like end-faces and which, therefore, can conduct plurality of image points. All these image points will reproduce at the other end-face of the image conductor the original image, provided that the ends of image conducting fibers remain in their original spatial relationship. Each fiber 114A should have, as was explained above, a diameter corresponding to the size of one image point. The diameter of 0.1 millimeter is well suitable for the purposes of my invention. In order to conduct an image of an area, e.g., of one square centimeter, we must have many fibers, the number of fibers being dependent on the resolution of reproduced image that we desire. If the resolution of the conducted image should be four lines per millimeter, and if the image is of one square centimeter in size, we will need 40 fibers of 0.25 millimeter in diameter. The light conducting fibers should be polished on their external surface very exactly. Each of them must also be coated with a very thin light opaque layer 114B to prevent spreading of light from one fiber to another. I found that without said light-impervious coating, the image will be destroyed by leakage of light from one tube to another. The light opaqued layer should have a lower index of refraction than the light conducting fiber itself. Such a coating may have a thickness of only a few microns. I found a great improvement of flexibility of the light conductor 114 can be obtained by having the light conducting fibers 114A glued together only at their end-faces 114a and 114b. This is a very important feature of my device because the main requirement from the light conductor 114 is its flexibility and malleability. If the fibers 114A are flued together along their entire length, the flexibility and malleability is so much reduced that it may not be possible to use it in many examinations in which the walls or passages are fragile and may be damaged by a rigid instrument. I found unexpectedly that having the conducting fibers 114A free along their path between the end-faces will not cause any deterioration of the conducted image. I found that in spite of the fact that fibers between their end-surfaces were freely movable, there was no blurring of the conducted image. It must be understood, however, that the fibers 114A at both end-faces of the conductor 114 must rigidly maintain their spatial relationship. Another important feature of this construction is that the diameter of the light conductor 114 can be now increased because no space consuming binder or flue is present between the fibers 114A except at their end-faces. Instead of using the binder at the end-faces of fibers 114A, they may also be held together at their end-faces by a fine mesh screen. Each fiber is threaded through one opening of said mesh screen and is being held by said screen in constant position. It may be added that smaller loss of light may be obtained if the fibers 114A are hollow inside instead of being solid.

The number of fibers that can be used in many examinations will be limited by the diameter of the passages through which my intrascope has to pass. As in many situations, the channel may be only 1–2 cm. wide, it will be impossible to use a great number of fibers or a single-rod of a large diameter. I succeeded in overcoming this limitation by using in combination the light conductor 114 with a demagnifying optical system 140. By the use of the demagnifying optical system I can reduce the examined field to the diameter of the image conductor 114. If the optical system will demagnify the image five times, I can examine the field having 25 cm². with the image conductor having the diameter of only 1 cm². This combination of a light conductor with an optical system represents a very important feature of my invention, as it is not always practical or feasible to limit the examined field only to the diameter of the image conductor.

The light image conductor 114 may be introduced into examined part simultaneously with the intrascope. In some cases it is preferable to introduce my intrascope first and then insert the image conductor into intrascope. In some cases the optical system 113 or 140 may be attached to the end-face 114b of the image conductor to make one unit.

In some cases it is possible to use a light conductor 114 (which consists of a single large rod instead of plural fibers 114A) as was described above. The material for the "single rod conductor" may be flexible acrylic plastics, polystyrenes or Lucite. The light conducting rod must be coated with a light-impervious layer 114B of material having a lower index of refraction than the rod itself, such as carbon, graphite or aluminum, except on the surfaces which serve to admit the light or to let the light escape from the conductor. The single rod conductor cannot conduct an image but only successive light signals.

The proximal end 114a of the light conductor 114 must be maintained in a fixed spatial relationship with the flying spot kinescope 109 by mechanical means which may be constructed in the form of a perforated rigid member 117. The light conductor 114 passes through the aperture of said member and is attached thereto. The member 117 is rigidly attached to the kinescope 109 and establishes thereby fixed relationship between the proximal end 114 of conductor and the kinescope 109. The light conductor 114 directs the successive light spots produced by the flying spot kinescope into the endoscope 115. The scanning light spots emerging from the distal end 114b of the conductor 114 are focused by a suitable optical system 113a on the image sensitive member 120. The impingement of scanning illumination converts the electrical pattern which represents the image of the examined part and which is stored in said member 120 into successive electrical signals. The electrical signals are conducted to the outside of the examined part by wires 43 or by printed circuits and are fed into receivers to reproduce the image. In addition, electrical signals may be used to activate various circuits or devices used for industrial sorting and testing. The distal end 114b of the light conductor 114 must also be maintained in a fixed position in relation to the image sensitive member 120, which may be of any type described above, such as tube 16b or 16B' or 16c or screen 127, when the image of the examined part is transmitted. The rigid plates of rods 116 and 117 with rigid extensions 116a and 117a, to which the distal end 114b of the light conductor is attached, serve to maintain the distal end of the light conductor in a fixed position. I found furthermore that the endoscope 102 will not operate properly if the distal end 114 of the light conductor 114 and the image sensitive element 120 are not maintained in a fixed position. The rigid rods 118 and 119 connected to the image pick-up element 120 serve for this purpose. It should be understood that instead of rods, a rigid box, which incloses both the element 120 and the end 114b of the conductor, will provide their immobilization as well. The remaining parts of the endoscope 102 may be the same as described above.

It should be understood that the image sensitive element 120 may have many embodiments, all of which come within the scope of this invention. The pick-up element 120 may haxe flexible sidewalls, as was described above, in some sections or throughout the whole length of sidewalls. Furthermore, element 120 may have completely rigid sidewalls when used in combination with a light conductor 114. The image pick-up element 120 may be of photoemissive type or may be of photoconductive type or of photovoltaic type and may comprise any material described above.

Another improvement of the endoscope is shown in FIG. 14. I found that the loss of light conducted by the conductor 114 becomes very high if the conductor extends over the length of a few feet. It is necessary, therefore, to utilize all the light available from the flying spot kinescope 109. The optical system 113 or 113a in the fastest form still causes a loss of at least 90% of useful light. I found, therefore, that in examinations of remote parts, it was necessary to eliminate the optical system 113 or 113a or both. FIG. 14 shows flying spot kinescope 122, in which all of the endwall 111a or a part of said endwall is replaced by the light conductor 114, which may be of materials described above but preferably should be of quartz. The proximal end-face 114a of the conductor 114 may be flush with the rest of the endwall of the kinescope 122 or may extend inside of the kinescope 122. The fluorescent screen 94 is deposited on said endface 114a. This construction eliminates the optical system and in spite of it, there is no loss of sharpness of the scanning light spot, because of a close apposition of the fluorescent screen 94 and of the light conductor 114.

A similar construction is used in the distal end 114b of the conductor whereby the distal end 114b enters into image sensitive member 120 to establish an optical contact with the image sensitive screen, such as 34, 34A, 34B or 111 disposed in said image sensitive member.

The same construction may be applied advantageously to the embodiment of invention shown in FIG. 1D whereby the distal end 114 of the light conductor 114 will be in contact with the screen 127.

A rotating mirror 21a may be used in addition to lens 21 to receive the image through various windows. The remaining parts of the endoscope 103 may be the same as described above.

It should be understood that in examinations in which the definition of the image is not important, the image conductor 114 may be placed in contact with the endwall of the flying spot kinescope or with the endwall of the image sensitive member either of television type or of image reproducing type, without penetrating into such a vacuum tube or photocell.

In another embodiment of invention the flying light spot tube is used to produce a scanning illumination of the examined body instead of the scanning illumination of the image sensitive element, as was described above, and is disposed outside of the examined body. This endoscope 104 is shown in FIG. 15. The kinescope 109a may be of any of constructions described above, such as the tube 16a 109 or 122. The light conductor 114 may be the same as was described above. The flying spot is projected by the optical system 150 onto the examined part.

The optical system 150 is an important feature of this invention. As the diameter of the image conductor 114 is limited by the narrow passages, the field of the examined body, which may be scanned through the image conductor, is necessarily limited. By using, however, an optical system 150, which produces five-fold enlargement, it is possible now to cover the field of the examined part, which is five times larger. This feature proved to be very important in some examinations.

The reflected light spot is admitted through the window 18 to the image sensitive element 131, which in this construction may be in the form of a multiplier phototube. In some cases the solid state photoconductive devices, such as photodiodes or phototransistors, may be used as an image sensitive element instead of a vacuum tube 131. It should be understood that the multiplier phototubes, such as 131, photodiodes or photocells, such as 127, cannot produce an image without the use of a scanning illumination for forming plurality of successive image points. The use of an ordinary field illumination in combination with phototubes or photocells will produce only signals but not images.

The reflected successive light spots are converted by the element 131 into successive electrical signals. Electrical signals are conducted outside of the examined part and may be reconverted into visible images, as is well known in television art. It should be understood that the electrical signals may be also fed into various utilization circuits provided with "absorption negatives" or other mechanism used for sorting and testing materials. I found that an essential feature of this embodiment of endoscope is the maintenance of a fixed spatial relationship between the flying spot kinescope 109a and the proximal end 114a of the light conductor 114. The distal end 114b of the light conductor 114 also must be immobilized. The immobilization of the kinescope 109 and of the proximal end 114a of the light conductor was described above. The fixed spatial relationship between the distal end 114b of the light conductor and window 12 may be provided by rigid rods 116a and 117a, or by enclosing the distal end of the light conductor in a rigid light-impervious box 147.

Furthermore, if no such box is used, there must be provided light-impervious partitions 142 which prevent the light from the light image conductor 114 to reach the image sensitive element 131 before being modulated and reflected by the examined part.

In some cases the flying spot kinescope 109 may be mounted inside of the endoscope or may be introduced inside of the examined body or object but will remain outside of the endoscope.

In some cases the scanning illumination of the examined part is directed through the distal end of the endoscope 105 as it is shown in FIG. 15a. The light from the light conductor 114, which may extend beyond the endoscope through the opening 151, is focused on the examined part by the optical system 150. The reflected light is admitted into endoscope through windows 152 or 153 and is focused by lenses 152a or 153a on the image sensitive member 131 or 131a or both.

Another important improvement of all the endoscopes described above is the use of a flexible source of illumination instead of conventional, rigid bulbs or lamps. The flexible light source 135 is illustrated in FIG. 16. The light source 135 comprises fluorescent layer 138, a light transparent conducting layer 137, another light transparent layer conducting layer 139. One of conducting layers 137 and 139 may be light opaque instead of being light transparent. The layers 137 or 139 may be continuous or preferably in the form of a fine mesh or grid. The layers 137 and 139 are connected to an extraneous source of A-C or D-C electrical potential, preferably, however, of A-C type. The electrical potential of 100 volts–1,000 volts and frequency of 50 cycles per second up to 1,000 cycles per second for A-C type are sufficient to provide 10 ft. candles of illumination without producing any heat. This feature is of great importance in examination of the living bodies where the heat generated by conventional filament type of bulbs may be injurious to the adjacent tissues. The fluorescent material is embedded in a a dielectric medium 138c. This dielectric medium must be of a flexible and light transparent material. Some of materials described above were found very suitable for this purpose. In particular, polyesters, such as Mylar or Cronar, silicones or terephthalates, proved to be suitable for the purposes of this invention.

The illuminescent materials used for the layer 138 are sulphides or selenides activated with copper or any other phosphors which have electroluminescent properties. The flexible light source 135 may be made as a thin panel and may be disposed on the sidewalls or on the endwall of the endoscope.

The length of the flying spot skinescope 16a, 85 or 109 or any of its modifications is an important factor in the construction of endoscopes. The rigid part of the flying spot tube is due to the electron gun 28 or 90. Shortening of the electron gun would help therefore to reduce the rigid part of the flying spot tube. In some cases it is possible to image the source 163 of the electron beam on the fluorescent screen instead of imaging the cross-over of the electron beam on the fluorescent screen 31 or 94. This will allow shortening of the electron gun and thereby shortening of the tube 16a or 85 or 109. Also construction of the electron gun known as Wehnelt cylinder will permit reducing of the length of the electron gun. The electrostatic focusing field is provided in Wehnelt cylinder by the electrode adjacent to the filament of the electron gun.

In cases in which a small electron beam is necessary for a good definition of images, it is necessary to use a two-lens electron gun 164, which is shown in FIG. 17. Such a gun comprises filament 163 for emission of electrons, the first focusing electrode A, the first anode B, the second focusing electrode C and the second anode D, which may have the form of a conducting coating on the wall of the tube. This construction results in a longer electron gun than the one described above. In order to shorten this electron gun 164 without sacrificing sharpness of the electron beam, the members C and B are made movable on tracks or slide channels 162 and 165, so that they may be telescoped into each other before the insertion of the endoscope into the examined part. The knobs 154 and 155 serve to move the electrodes B and C. Racks 158 and 159 are secured on the outside wall of electrodes B and C respectively. Pinions 157 and 157a are mounted on shafts 156 and 156a respectively. The shafts 156 and 156a extend beyond the sidewall of the tube and are rotatable by knobs 154 and 155. The telescoping of the electrodes B and C will cause a considerable reduction of the length of the electron gun which was the purpose of this invention.

Another improvement of the endoscope is the use of the flying spot tube, which has instead of the electron gun only an electron emitter. The electron beam produced by the electron emitting source is injected along the edge of the tube and travels to the opposite endwall of said tube which houses the fluorescent screen 94. A plurality of transparent deflecting plates is mounted in front of fluorescent screen 94 and serves to direct the electron beam to successive points on the fluorescent screen to produce thereby aluminescent raster for scanning illumination. This embodiment of invention allows shortening of flying spot tube, which is of great importance to the endoscope.

In some examinations it may be possible to use a conventional source of light in combination with an oscillating mirror, instead of using a flying spot kinescope. The oscillating mirror may be made to vibrate in both horizontal and vertical planes. The oscillating mirror may be mounted on a pivot and may be energized by solenoids through which the current of high frequency is flowing. One set of coils serve to move the mirror in horizontal axis. Another set of coils is vibrating the mirror on vertical axis. The action of both coils makes the mirror oscillate in such a manner that the light reflected by said mirror will scan the area on which it is projected in the same manner as the flying spot which is produced by a cathode-ray tube. The construction of an oscillating mirror is well known in the art and it is believed therefore that its further detailed description will only serve to complicate the drawings. It may be preferable, however, if the oscillating mirror is mounted outside of the examined body to vibrate the mirror only in one plane, such as horizontal plane, and to use an optical drum to produce the vertical scanning displacement of the light spot from the mirror.

It was explained above that the light conductor of a single rod type cannot be used for conducting or transmitting images. I found, however, that it is possible to use a single rod light conductor for transmission of images by a device illustrated in FIG. 15d. In this embodiment of invention the source of scanning illumination, such as e.g., the flying spot kinescope 16a or 109 illuminates in a scanning manner the examined part and produced a successive image points of the examined part. Each of said image points is projected successively on the single rod light conductor 114C which, as explained above, can conduct only a single light signal, which means a single image point. The successive light signals are fed into phototube 131, which may be disposed inside the examined or outside of the examined part. The phototube is preferably a vacuum tube of multiplier type. In some examinations, a photoconductive photocell or a junction type of a photocell may be used for this purpose. The phototube 131 converts successive light signals into successive electrical signals. The electrical signals are fed into an image reproducing device, such as e.g., kinescope 16A. The kinescopes 16a and 16A are connected by synchronizing circuits which are well known in the television art.

Therefore, each image point produced by kinescope 16a will appear on the fluorescent screen of the kinescope 16A in a proper spatial relationship. If all image points will arrive in a rapid succession and in a proper spatial distribution, I found that a complete image of the examined part will be reproduced in kinescope 16A in spite of using a single rod conductor. The remaining parts of this endoscope may be the same as was described above.

Another advantage of this embodiment resides in discovery that if a single rod conductor has one of its side surfaces exposed, which means abraded and uncoated, it will be able to pick up light signals produced by kinescope 16a along its entire exposed surface. This will solve the problem of examination of large fields, as we will not be limited any more to the field which has the size of the endface of the light conductor.

In some cases it is preferable to have the image sensitive member outside of the examined body. The endoscope 106 which represents this embodiment of invention is illustrated in FIG. 15b. The endoscope 106 has light source, which may be of conventional type, or in the form of a flexible electro-luminescent lamp shown in FIG. 16. The light source illuminates the examined part through window 12. It should be understood that the light source may also be disposed outside the endscope and this applies to all embodiments of invention. The image of the examined part is admitted to the endoscope through window 18 and is focused on the image conductor 114 which comprises plurality of light conducting fibers. The conducted image emerges from the conductor 114 outside of the examined part or outside of the examined body and may be viewed by the examiner. In some examinations the emerging image has a very low brightness. It is advisable in such cases to direct the image to the image amplifying tube 120A or to a television camera. The image reproducing tube 120A has a photoelectric photocathode 145 which receives the conducted image and converts into an electron beam 143 and an image reproducing fluorescent screen 44 which reconnects the electron beam into an intensified visible image.

In some cases the end-face of the image conductor should be preferably disposed within the image amplifying tube 120A, or within the teveision pick-up tube in a similar manner as was described in FIG. 14. This endoscope may be used for producing color images of the examined part, as was described above. The use of rotating color filters 50 and 50a is one way of producing color images.

In some examinations it is preferable to have the image sensitive member and the source of scanning illumination both to be within the examined part. The endoscope 107, which represents this embodiment of invention, is shown in FIG. 15c. The scanning illumination may sometimes be delivered to the image sensitive member by an optical system, but I found that it is preferable to use the image conductor 114 for this purpose as relative positions of aforesaid members cannot be predicted and optical systems fail.

FIGURE 15c shows a modification of the endoscope in which the illumination is provided by a conventional source of light, such as electrical bulb 7, or by electro-luminescent source of light 135. This illumination is piped into the examined part through a flexible conductor 114c. The light conductor is in the form of a single rod as it does not serve to conduct an image but only illumination. The flexible light conductor 114c may be situated inside of the endoscope or outside of the endoscope. If it is outside of the endoscope it may be moved towards the wall of the examined part by shortening the thread or wire attached to its distal end. In this way the light may be brought closer to the examined part or may be even inserted into a narrow channel adjacent to the examined part which is not accessible to the endoscope itself.

It should be understood that the endoscope shown in FIG. 15b may have the image tube 120A or the image sensitive member, such as 16b and its modifications, 120 or 127, or a television pick-up tube disposed inside of the examined body. In such a case the end-face 114a of the image conductor is also within the examined body and may be inside of the endoscope or may be outside of the endoscope. The operation of such device as follows: the end-face 114b receives the image of the examined part through window 18. The image projected on the end-face 114b may be demagnified by the optical system 140 to reduce the size of the image to the size of cross-section of the image conductor 114. The image emerging at the proximal end-face 114a may be projected in the image sensitive member, such as 16b or its modifications described above, 120 or 127, or on a television pick-up tube, and will be thereby connected into electrical signals, as was described above. The electrical signals may be led to the outside of the examined body by a coaxial cable, as was explained above. The television pick-up tube may be of photoemissive type, photoconductive type, or photovoltaic type, and may use fast or slow scanning electron beam. The novelty of the combination of the image conductor with a television system resides in the ability of the intrascope provided with this combination to penetrate into locations which are inaccessible to television pick-up systems. The television pick-up system can then transmit the image to the outside of the examined body and it can do it regardless of the distance between the television tube and the outside. The image conductor on the other hand is limited in its ability to conduct an image for longer distance because of prohibitive loss of light.

I found that in some cases the combination of two different colors of illumination of the examined part allows the production of the image of pathological lesions in a color which was characteristic of a disease, facilitating thereby diagnosis. For this purpose an additional light source may be placed either outside of the endoscope or inside of the endoscope. If it is placed inside of the endoscope it may be piped to the examined part by a flexible light conductor in the form of a single rod 114C, as shown in FIG. 15c. The additional light may be a visible color, or it may be an invisible light, such as ultra-violet or infra-red light. It should be understood that all types of endoscopes may serve to produce true or arbitrary color images of the examined part in the manner described above.

Another important discovery was that supersonic waves can also be conducted by the image conductor 114 or 114C. By using as a source of image forming radiation piezoelectric or magnetostrictive generators of supersonic waves and conducting said waves to the examined part, we may produce supersonic images. Piezoelectric generators may be in the form of oscillating crystals of quartz, titanium compounds, such as titanates, Rochelle salts and other similar materials. The piezoelectric or magnetostrictive generators can be disposed within the examined body or may be disposed outside of the examined body. The supersonic waves may be directed to the examined part by supersonic lenses or preferably by means of the image conductor 114. The supersonic waves reflected or transmitted by the examined part may be directed to the supersonic image sensitive member by the same image conductor 114 or preferably by an additional image conductor. The supersonic sensitive member may have the form of piezoelectric elements, such as were described above for the supersonic generator, but smaller in size. In another embodiment of invention, the supersonic image sensitive member is a vacuum tube provided with a piezoelectric continuous or mosaic electrode mounted on the inside of the endwall of said tube. Said piezoelectric screen or electrode receives the supersonic image of the examined part through the endwall of said tube and converts said image into an electrical pattern of potentials or charges which correspond to said supersonic image. Such a vacuum tube is provided with a source of electron beam, such as electron gun for irradiation of said piezoelectric screen or electrode. The electron beam scans said piezoelectric screen or target and converts thereby the electrical pattern present on said screen or electrode into electrical signals in the manner well known in the television art.

It was also found that the light should be in some cases a polarized light. I found that in many examinations, especially in examination of the human body, the light scattered by the fluids contained in the examined part produces deterioration of contrast and detail of the image. In order to overcome this difficulty, a sheet 160 or a prism of material, such as calcite or tourmaline, which polarizes the light, is placed in front of the light source 7, 109 or 135. Another filter 161, which transmits only the polarized light and reflects the scattered light, is placed in front of the image pick-up member 16a, 16B, 16C, 16D, 120, 131 or 127. The scattered light is not polarized and will be therefore reflected by the filter 161. As a result, it will, therefore, be prevented from reaching the image pick-up element and will not fog the image any more. This improvement applies to all embodiments of invention.

Another complication encountered in operation of this device was fogging of the windows 12 or 18, 152, 153 or any other windows, due to condensation of vapor when entering the parts having a higher temperature, such as recesses of the living body. I found that the use of electrically conducting glass for windows, which is connected to an extraneous source of the electrical potential, prevents the condensation of vapor. Another solution of this problem is to provide a double-walled window containing a transparent silica gell. This improvement applies to all embodiments of my device.

It should be understood that in all embodiments of invention the source of illumination may be disposed in such a manner that its long axis is in the long axis of the endoscope or that its long axis is perpendicular to the long axis of the endoscope.

It should be understood that in all embodiments of my invention, the light source of source of an invisible image forming radiation may be disposed inside of the endoscope or may be disposed outside of the endoscope. Furthermore said source of image forming radiation may be supported by the endoscope or may be completely independent of the endoscope. This applies to sources of field illumination and of scanning illumination.

It should be also understood that the term "light" used in specification and in appended claims comprises both visible and invisible radiations and also represents both electro-magnetic, acoustic and corpuscular radiations.

It should be further understood that in all embodiments of invention the source of image forming radiation may be disposed outside of the examined body and projected into the examined body by a suitable optical system or by a light conductor.

As various possible embodiments might be made of the above invention, and as various changes might be made in the embodiment above set forth, it is to be understood that all matter herein set forth or shown in the accompany drawings is to be interpreted as illustrative and not in a limiting sense.

What is claimed is:

1. A vacuum tube device comprising in combination an evacuated envelope, a plurality of members conducting radiation image by internal reflection of said radiation in said members and luminescent means mounted within said tube for emitting luminescent radiation, said members having their endface within said tube, said members having a core of material transparent to at least a part of said radiation and of a high index of refraction and each of said members being provided with its own individual coating means of a thickness not exceeding a few microns and comprising a material of a lower index of refraction than said core, said coating means mounted on each of said members and preventing spreading of said radiation from one of said members to another member, the ends of said conducting members disposed within said tube having said luminescent means mounted on said ends of all said members.

2. A device as defined in claim 1, which comprises in addition means producing a beam of electrons.

3. A device as defined in claim 1, in which said members are entirely solid and which comprises in addition means for producing a beam of electrons.

4. A device as defined in claim 1, in which said members are entirely solid and which comprises in addition metallic electron pervious means adjacent said luminescent means, means for producing an electron beam and means for deflecting said beam to produce a scanning motion of said beam.

5. A device as defined in claim 1, in which comprises in addition photosensitive means for receiving luminescent radiation produced by said lumescent means.

6. A device as defined in claim 1, in which said coating means are in addition opaque to said radiation.

7. A device as defined in claim 6, in which said members are entirely solid and which comprises in addition means for producing an electron beam.

8. A device as defined in claim 6, which comprises in addition means for producing an electron beam and means for deflecting said beam to produce a scanning motion of said beam.

9. A device as defined in claim 6, in which said members are entirely solid and which comprises in addition means for producing an electron beam and means for deflecting said beam to produce a scanning motion of said beam.

10. A device as defined in claim 6, in which said members are entirely solid and which comprises in addition metallic electron pervious means adjacent said luminescent means, means for producing an electron beam and means for deflecting said beam to produce a scanning motion of said beam.

11. A device as defined in claim 6, in which said members are entirely solid and in which said radiation conducting members form at least a part of the endwall of said tube.

12. A device as defined in claim 6, in which said members are entirely solid and in which said luminescent means form a screen having a planar shape.

13. A device as defined in claim 6, and which comprises in addition photosensitive means for receiving said luminescent radiation produced by said luminescent means.

14. A device comprising in combination luminescent means producing luminescent radiation, a conductor for said radiation comprising an array of a plurality of members, said member having the property of conducting said radiation by internal reflection, said members having a core of material transparent for said radiation and having a high index of refraction, said members being provided with a coating means of a lower index of refraction than said transparent core, said coating means having the thickness not exceeding a few microns and preventing the escape of said radiation from said members, said device furthermore comprising photosensitive means mounted adjacent one end of said members, said luminescent means being mounted on the opposite end of said members and being provided with metallic electron pervious means adjacent said luminescent means, said photosensitive means and said luminescent means being mounted within a vacuum tube.

15. A device as defined in claim 14, which comprises light opaque material between said members and in which said image reactive means comprise photoemissive means including antimony and producing a beam of free electrons, and which device comprises in addition means for receiving said electrons.

16. A device as defined in claim 14, which comprises in addition means for producing electrical signals.

17. A device comprising in combination luminescent means producing luminescent radiation, an image conductor comprising two-dimensional array of a plurality of members, said members having the property of conducting said radiation by internal reflection, said members having a core of material transparent for said radiation and having a high index of refraction, said members being provided with light opaque coating means having the thickness not exceeding a few microns for preventing the escape of said radiation from said members said device furthermore comprising photosensitive means mounted adjacent one end of said members, said luminescent means being mounted on the opposite end of said members and being provided with light opaque and electron pervious means, said photosensitive means and said luminescent means being mounted within a vacuum tube.

18. A device as defined in claim 17, in which said image reactive means comprise photoemissive means producing a beam of free electrons, and which device comprises in addition means for receiving said electrons.

19. A device as defined in claim 17, which comprises in addition means for producing electrical signals.

References Cited

UNITED STATES PATENTS

| 2,354,591 | 7/1944 | Goldsmith | 88—1 X |
| 2,603,757 | 7/1952 | Sheldon | 313—65 X |
| 2,877,368 | 3/1959 | Sheldon | 313—65 |
| 3,205,390 | 9/1965 | Sheldon | 313—65 |

OTHER REFERENCES

Van Heel, A.C.S., A New Method of Transporting Optical Images, Nature, Jan. 2, 1954, p. 39 relied on.

Van Heel, A.C.S., Optical Representation of Images Without Use of Lenses on Mirrors, De Imgemieur 535.31, vol. 24, June 12, 1953 (pp. 25–27 relied on).

RALPH G. NELSON, *Primary Examiner.*

SAUL ELBAUM, *Assistant Examiner.*

U.S. Cl. X.R.

350—96; 250—227

Disclaimer 3,423,620.—*Edward Emanuel Sheldon*, New York, N.Y. VACUUM TUBE DEVICE HAVING LIGHT CONDUCTING RODS AND LUMINESCENT SCREEN. Patent dated Jan. 21, 1969. Disclaimer filed Aug. 13, 1973, by the inventor.

Hereby disclaims the term of this patent subsequent to Mar. 26, 1984.

[*Official Gazette April 22, 1975.*]

Disclaimer and Dedication

3,423,620.—*Edward Emanuel Sheldon*, New York, N.Y. VACUUM TUBE DEVICE HAVING LIGHT CONDUCTING RODS AND LUMINESCENT SCREEN. Patent dated Jan. 21, 1969. Disclaimer and dedication filed Nov. 11, 1976, by the assignee, *American Optical Corporation*.

Hereby disclaims and dedicates to the Public the remaining term of said patent.

[*Official Gazette February 1, 1977.*]